United States Patent
Fochtman et al.

(10) Patent No.: US 11,231,032 B2
(45) Date of Patent: Jan. 25, 2022

(54) FUEL SENDING UNIT ASSEMBLY AND OPERATION

(71) Applicant: Continental Automotive Systems, Inc., Auburn Hills, MI (US)

(72) Inventors: James Fochtman, Williamsburg, VA (US); John Walters, Williamsburg, VA (US); Tyler Craven, Norfolk, VA (US); Joe Angelino, Newport News, VA (US)

(73) Assignee: Vitesco Technologies USA, LLC, Auburn Hills, MI (US)

( * ) Notice: Subject to any disclaimer, the term of this patent is extended or adjusted under 35 U.S.C. 154(b) by 514 days.

(21) Appl. No.: 16/026,916

(22) Filed: Jul. 3, 2018

(65) Prior Publication Data
US 2019/0003474 A1 Jan. 3, 2019

Related U.S. Application Data

(60) Provisional application No. 62/528,417, filed on Jul. 3, 2017, provisional application No. 62/528,345, filed
(Continued)

(51) Int. Cl.
*F04B 17/04* (2006.01)
*F04B 53/10* (2006.01)
(Continued)

(52) U.S. Cl.
CPC ......... *F04B 53/1087* (2013.01); *F02M 37/08* (2013.01); *F02M 37/10* (2013.01);
(Continued)

(58) Field of Classification Search
CPC . H02K 5/00–26; F04B 53/20; F04B 53/1087; F04B 53/103; F04B 53/109;
(Continued)

(56) References Cited

U.S. PATENT DOCUMENTS

| 2,971,531 A | 2/1961 | Jurs et al. |
| 3,059,665 A * | 10/1962 | Cobb ................... F16K 15/025 |
| | | 137/512 |

(Continued)

FOREIGN PATENT DOCUMENTS

| CN | 102506201 A | 6/2012 |
| CN | 103857899 A | 6/2014 |

(Continued)

OTHER PUBLICATIONS

International Search Report and the Written Opinion of the International Searching Authority dated Dec. 4, 2018 for corresponding PCT application No. PCT/US2018/040782.
(Continued)

*Primary Examiner* — Devon C Kramer
*Assistant Examiner* — Thomas Fink

(57) ABSTRACT

A fuel pump, is disclosed, including a power group having a housing, a coil, a pole piece and a movable armature; a valve group including a valve body, a plunger connected to the armature, a bushing in which the plunger is disposed, an inlet chamber, an outlet chamber, a pump chamber, an inlet valve disposed between the inlet chamber and the pump chamber and an outlet valve disposed between the pump chamber and the outlet valve; and an inlet filter coupled to a fluid inlet of the valve group. The inlet filter is disposed relative to the coil such that when the fuel pump is disposed within a fuel tank, a bottom of the inlet filter as oriented in the fuel tank is disposed above a fuel level in the fuel tank and the coil is at least partly submerged in the fuel.

17 Claims, 13 Drawing Sheets

Related U.S. Application Data on Jul. 3, 2017, provisional application No. 62/528,348, filed on Jul. 3, 2017, provisional application No. 62/528,351, filed on Jul. 3, 2017, provisional application No. 62/528,356, filed on Jul. 3, 2017, provisional application No. 62/528,412, filed on Jul. 3, 2017.

(51) Int. Cl.

| | | |
|---|---|---|
| *F16K 31/06* | (2006.01) | |
| *F02M 37/10* | (2006.01) | |
| *H01F 7/08* | (2006.01) | |
| *H01F 7/16* | (2006.01) | |
| *F02M 59/46* | (2006.01) | |
| *F02M 51/04* | (2006.01) | |
| *F02M 63/00* | (2006.01) | |
| *F02M 37/08* | (2006.01) | |
| *F02M 59/10* | (2006.01) | |
| *F04B 23/02* | (2006.01) | |
| *F02M 55/00* | (2006.01) | |
| *F04B 39/10* | (2006.01) | |
| *F16K 1/42* | (2006.01) | |
| *F16K 15/02* | (2006.01) | |
| *F16K 27/02* | (2006.01) | |
| *F16K 15/14* | (2006.01) | |
| *F02M 51/06* | (2006.01) | |
| *F02M 59/36* | (2006.01) | |
| *B21D 39/06* | (2006.01) | |
| *F02M 37/54* | (2019.01) | |
| *F02M 37/04* | (2006.01) | |

(52) U.S. Cl.
CPC ........ *F02M 51/04* (2013.01); *F02M 51/0614* (2013.01); *F02M 55/007* (2013.01); *F02M 59/10* (2013.01); *F02M 59/367* (2013.01); *F02M 59/462* (2013.01); *F02M 59/464* (2013.01); *F02M 59/466* (2013.01); *F02M 63/0019* (2013.01); *F02M 63/0078* (2013.01); *F04B 17/04* (2013.01); *F04B 23/021* (2013.01); *F04B 39/1046* (2013.01); *F04B 53/10* (2013.01); *F04B 53/103* (2013.01); *F04B 53/109* (2013.01); *F04B 53/1032* (2013.01); *F04B 53/1035* (2013.01); *F16K 1/42* (2013.01); *F16K 15/02* (2013.01); *F16K 15/028* (2013.01); *F16K 15/14* (2013.01); *F16K 27/0209* (2013.01); *F16K 31/0689* (2013.01); *H01F 7/081* (2013.01); *H01F 7/1607* (2013.01); *B21D 39/06* (2013.01); *F02M 37/043* (2013.01); *F02M 37/54* (2019.01); *F02M 2200/8053* (2013.01)

(58) Field of Classification Search
CPC ... F04B 17/04; F04B 23/021; F02M 63/0078; F02M 37/08; F02M 37/10; F02M 37/043; F02M 37/54; F02M 37/0011; F02M 51/04; F02M 59/10; F02M 59/462; F02M 59/464; F02M 59/367; F02M 55/007; F02M 2200/8053; F16K 1/42; F16K 15/028

See application file for complete search history.

(56) References Cited

U.S. PATENT DOCUMENTS

| | | | |
|---|---|---|---|
| 3,613,718 A | 10/1971 | Ballinger | |
| 3,625,248 A | 12/1971 | Lhotellier | |
| 3,874,487 A | 4/1975 | Keijzer et al. | |
| 4,240,434 A | 12/1980 | Newkirk | |
| 4,269,572 A * | 5/1981 | Nozawa | F04B 17/042 137/110 |
| 4,624,347 A | 11/1986 | Mourray | |
| 4,782,925 A | 3/1988 | Grundei | |
| 4,743,179 A * | 5/1988 | Waas | F04B 17/042 417/417 |
| 4,747,475 A | 5/1988 | Hagwood et al. | |
| 4,878,815 A * | 11/1989 | Stachowiak | F04B 53/1025 417/63 |
| 4,917,181 A | 4/1990 | Kiernan | |
| 4,934,907 A | 6/1990 | Kroner | |
| 5,022,832 A | 6/1991 | Lauterbach et al. | |
| 5,413,195 A | 5/1995 | Murakami | |
| 5,727,594 A * | 3/1998 | Choksi | A61M 39/24 137/537 |
| 5,813,500 A * | 9/1998 | Deferme | F16F 9/341 188/282.8 |
| 5,881,759 A * | 3/1999 | Andersson | E03C 1/122 137/246 |
| 6,240,962 B1 | 6/2001 | Tai | |
| 6,276,498 B1 | 8/2001 | Kirchner | |
| 6,382,372 B1 | 5/2002 | Keil et al. | |
| 6,390,130 B1 | 5/2002 | Guala | |
| 6,401,749 B1 | 6/2002 | Tai et al. | |
| 6,405,750 B1 | 6/2002 | Rogala | |
| 7,096,883 B2 | 8/2006 | Gessat et al. | |
| 8,016,088 B2 | 9/2011 | Morita | |
| 8,528,591 B2 | 9/2013 | Pirk et al. | |
| 8,794,265 B2 | 8/2014 | Handke et al. | |
| 8,955,654 B2 | 2/2015 | Nygren et al. | |
| 9,033,123 B2 | 5/2015 | Kobayashi et al. | |
| 9,121,524 B2 | 9/2015 | Ashiba | |
| 9,188,117 B2 | 11/2015 | Ito et al. | |
| 10,082,008 B2 | 9/2018 | Robey et al. | |
| 2002/0176786 A1 | 11/2002 | Hirose et al. | |
| 2004/0182446 A1 | 9/2004 | Semeia | |
| 2005/0051395 A1 | 3/2005 | Deferme | |
| 2006/0091762 A1* | 5/2006 | Haneball | H02K 5/225 310/309 |
| 2008/0230733 A1* | 9/2008 | Spiegl | F16K 15/08 251/333 |
| 2010/0266432 A1 | 10/2010 | Pirk et al. | |
| 2012/0085323 A1 | 4/2012 | Allen et al. | |
| 2013/0061939 A1 | 3/2013 | Leppert et al. | |
| 2013/0062440 A1 | 3/2013 | Czimmek | |
| 2014/0217318 A1 | 8/2014 | Schlick et al. | |
| 2015/0034437 A1 | 2/2015 | Yamada | |
| 2015/0077562 A1 | 3/2015 | Heckel et al. | |
| 2015/0357107 A1* | 12/2015 | Fochtman | H01F 7/13 417/53 |
| 2016/0237973 A1 | 8/2016 | Bleeck et al. | |
| 2017/0204930 A1 | 7/2017 | Miwa et al. | |
| 2017/0268469 A1* | 9/2017 | Plisch | F02M 31/125 |
| 2017/0321643 A1* | 11/2017 | Krause | F02M 59/464 |
| 2018/0251122 A1 | 9/2018 | Golston et al. | |
| 2018/0340589 A1 | 11/2018 | Cheong | |

FOREIGN PATENT DOCUMENTS

| | | |
|---|---|---|
| CN | 105008709 A | 10/2015 |
| DE | 1809954 A1 | 5/1970 |
| DE | 1911534 A1 | 9/1970 |
| DE | 102011005487 A1 | 9/2012 |
| DE | 102014208614 A1 | 11/2015 |
| EP | 3117918 A1 | 1/2017 |
| JP | S57171 Y2 | 1/1982 |
| JP | S595783 A | 1/1984 |
| WO | 2012123131 A1 | 9/2012 |
| WO | 2016087064 A1 | 6/2016 |

OTHER PUBLICATIONS

File history for U.S. Appl. No. 16/025,268, including final Office Actions dated May 21, 2020 and Aug. 5, 2020.

(56) References Cited

OTHER PUBLICATIONS

File history for U.S. Appl. No. 16/023,988, including non-final Office Action dated Mar. 6, 2020.

* cited by examiner

FUEL SENDING UNIT ASSEMBLY AND OPERATION

CROSS REFERENCE TO RELATED APPLICATIONS

The present application claims the benefit of the following provisional applications filed on Jul. 3, 2017: application No. 62/528,348, titled "Combined Inlet and Outlet Check Valve Seat"; application No. 62/528,345, titled "Asymmetric Spring Valve Disk"; application No. 62/528,356, titled "Hydraulic Damping of a Solenoid"; application No. 62/528,412, titled "Fuel Pump Valve Configuration and Assembly"; application No. 62/528,351, titled "Fuel Pump Solenoid Assembly Method"; and application No. 62/528,417, titled "Fuel Sending Unit Assembly and Operation." The content of these provisional patent applications are incorporated by reference herein in their entirety.

FIELD OF INVENTION

This invention combines high volume manufacturing techniques and utilizes low cost manufactured components to fabricate a high speed electromagnetic solenoid-driven, positive displacement fuel pump.

BACKGROUND

Gasoline fuel pumps have been used for years and can be driven mechanically or electrically driven. Among the electrically powered fuel pumps, the most common style is submerged in a fuel tank and has a turbine to push fuel from the pump into the fuel line. This style pump is designed for a system that requires a constant flow of pressurized fuel from the tank and into the fuel line. It pumps fuel and draws electrical power for the entire time the ignition is "on" or the engine is running. Fuel typically passes through a filter between the tank and the fuel rail. Fuel injectors, which provide the fuel to the internal combustion engine, are ported into the fuel rail. These fuel injectors require relatively precise control of the fuel pressure to provide accurate metering of fuel required by the engine. To accomplish this, the fuel rail also has a pressure regulator which controls the pressure in the rail (and effectively the injectors) by allowing any overpressure fuel to pass through the regulator and return to the tank by means of an additional fuel line.

The problems with the prior fuel pump, is really a problem with the pump and the system components needed to allow the system to operate. Such prior pumps/systems are also heavily focused on automotive applications, which have high fuel flow and complex system controls which the automobile can bear the cost and the weight/size since that was the intended application for these system components. The problem for these pumps/systems appears while incorporating this system into small displacement, non-automotive systems. For example, a 125 cc scooter designed originally to operate with a naturally aspirated engine (carbureted), does not have the space in the fuel tank or the ability to bear the cost of an oversized system developed for automobiles. This example application would also have problems delivering the electrical power required to operate the fuel pump and all of the system components, especially running the pump continuously while at idle, since the system was originally designed to provide minimal electrical power used for accessories.

As a result, prior pumps/systems are a mismatch in cost, size, system complexity and electrical power for a small displacement, non-automotive application. This mismatch between existing fuel system technology and requirements for this non-automotive market has hindered the adoption of cleaner running, more reliable fuel injected systems. Much of this market around the world is still running on naturally aspirated engines.

SUMMARY

The example embodiments address the problems identified with the prior pumps and pump systems. The example embodiments utilize fewer and smaller components that use less power and are configured specifically for the 2-3 wheeler small engine displacement market.

Example embodiments utilize a solenoid described in United States patent publications 20150357107 and 20160108909, the contents of which are incorporated by reference herein in their entirety.

Example embodiments use a reduced or minimal number of low cost components that when combined as described herein, outperforms prior designs in electromagnetics, noise, durability, ease of assembly and cost of components.

The example embodiments are directed to a fuel pump, known as a fuel sending unit or FSU. To understand this fuel pump, it is helpful to start with understanding of the FSU system, since this is also a significant improvement over prior systems with regards to cost, size, complexity and power consumption. Related to the system, the pump provides a filtered, metered by volume of fuel "sent" from the tank to the fuel line (not shown) at the proper pressure. This "sent" fuel keeps a fuel line at the proper pressure for the fuel injector (not shown) ported to the other end of the fuel line. This allows for the removal of the return line, inline filter and a pressure regulator. The pump is commanded by an electronic control unit (ECU) and generally runs synchronously or asynchronously with the timing of the fuel injector which is also controlled by the ECU (not shown), actuation to provide the fuel at the proper time.

In an example embodiment, there is disclosed a fuel pump, including: a power group including a housing, a coil, a pole piece and an armature, the coil, pole piece and armature are disposed within the housing, the armature being movable within the housing; and a valve group including a valve body, a plunger connected to the armature so as to be movable therewith, a bushing in which the plunger is at least partly disposed, an inlet chamber, an outlet chamber, a pump chamber, an inlet valve disposed between the inlet chamber and the pump chamber and an outlet valve disposed between the pump chamber and the outlet valve. The valve body includes a plurality of planar portions which extend around an end portion of the valve body which is connected to the power group, and an end portion of the housing of the power group covers the end portion of the valve body and has a roll-formed engagement with the planar portions of the valve body.

In an example embodiment, the valve body includes a flange at the end portion of the valve body, the flange having an outer diameter that is greater than an outer diameter of the valve body at other portions of the flange, and the planar portions are disposed along the outer diameter of the flange.

In another example embodiment, an inlet filter is coupled to a fluid inlet of the valve group, wherein the inlet filter is disposed relative to the coil such that when the fuel pump is disposed within a fuel tank, a bottom of the inlet filter, as oriented in the fuel tank, is disposed above a fuel level in the fuel tank while the coil is at least partly submerged in the fuel.

In still another embodiment, the outlet valve includes a valve seat, an outlet disk, and an outlet spring all disposed within the valve body, wherein the outlet spring biases the outlet disk towards the valve seat. A longitudinal axis of the outlet spring may be offset from a longitudinal axis of the outlet disk. The outlet valve may further include a spring retainer disposed in the pump body, the outlet spring is disposed at least partly in the spring retainer and a longitudinal axis of each of the outlet spring and the spring retainer is offset from a longitudinal axis of the outlet disk.

In another example embodiment, the valve seat includes a disk and a seat ring disposed along and extending from the disk, the seat ring defining at least part of an outer wall of the inlet chamber, and the valve group further includes a stop wire disposed at least partly around the seat ring. The stop wire may have an annular shape with a gap defined in the stop wire, the gap providing a path for trapped air bubbles disposed outside of the seat ring to enter the pump chamber when the fuel pump is disposed in a fuel tank, for exiting the pump body through the outlet valve.

In another embodiment, the valve group and the power group include a first fuel flow path from the pump chamber to outside the housing of the power group, including between an inner diameter of the bushing and an outer diameter of the plunger, and between an inner diameter of the housing and the outer diameter of the coil, the first fuel path passing fuel under pressure from the pump chamber to the power group during a downstroke of the armature and the plunger so that fuel pressure within the power group is positive during operation of the fuel pump.

In another embodiment, a method for assembling a fuel pump is disclosed. The method includes forming a power group assembly having a housing, a coil, a pole piece and an armature, the coil, pole piece and armature are disposed within the housing, the armature being movable within the housing; and forming a valve group assembly having a valve body, a plunger connected to the armature so as to be movable therewith, a bushing in which the plunger is at least partly disposed, an inlet chamber, an outlet chamber, a pump chamber, an inlet valve disposed between the inlet chamber and the pump chamber and an outlet valve disposed between the pump chamber and the outlet valve, the valve body including a plurality of planar portions which extend around an upper end portion of the valve body. The method further includes placing a portion of the power group housing over an upper end portion of the valve body and roll forming the power group housing thereto. The pole piece includes a hollowed through-bore defined axially through the pole piece, and the method further includes, following the placing and the roll forming, inserting a calibration spring within a hollowed through-bore of the pole piece, the calibration spring contacting the plunger, inserting a spring retainer within the through bore over the calibration spring, and fixing the spring retainer to the pole piece.

DETAILED DESCRIPTION

Figure 1:
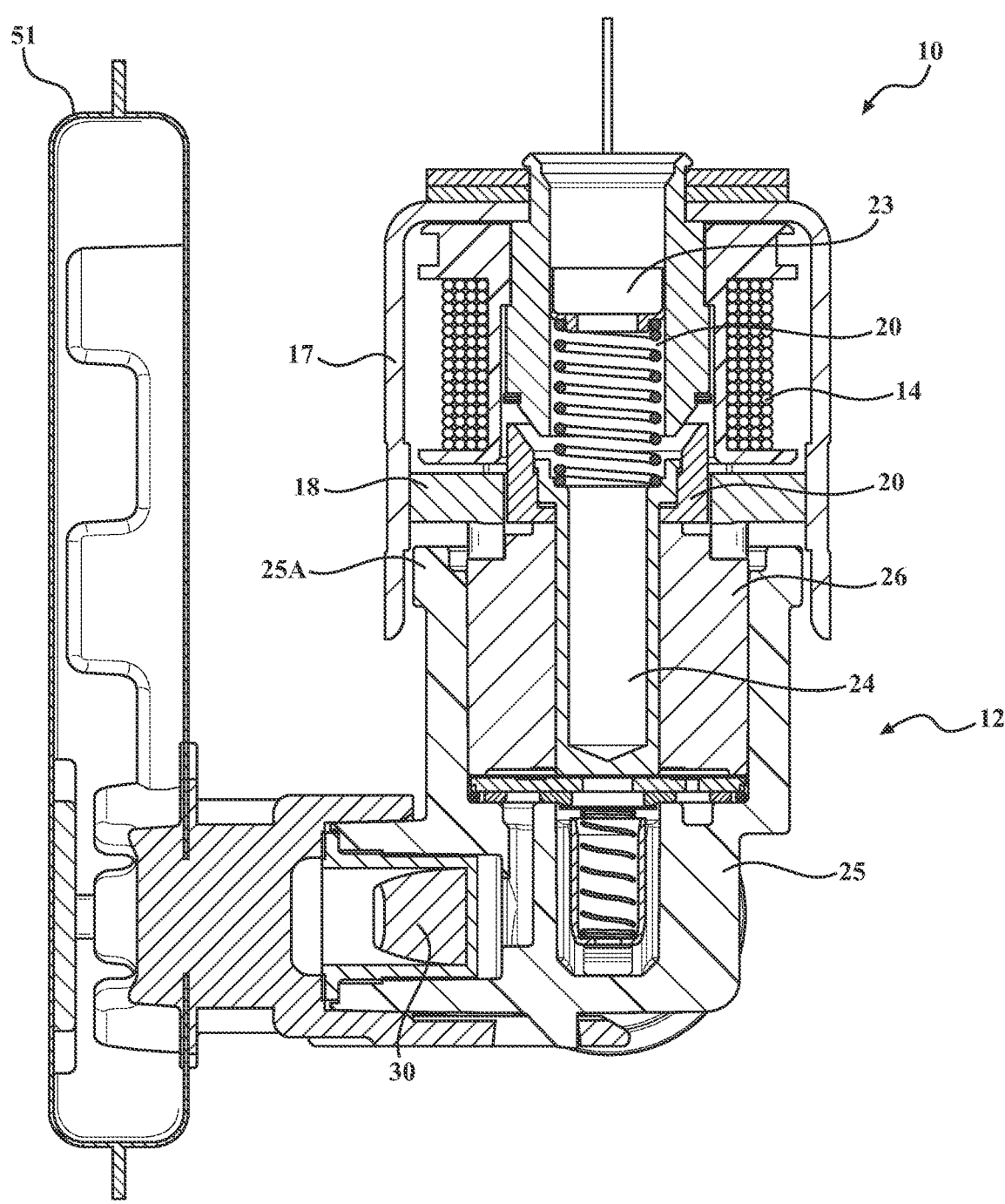
FIG. 1 is a cross sectional view of a fuel pump according to an example embodiment in a de-energized position.

Example embodiments are generally directed to a fuel pump which pumps fuel into a fuel line of an apparatus, such as a two or four wheeled vehicle, having a gasoline combustion engine. The pump is controlled by an ECU of the apparatus.

It is understood that references to "upstream" and "downstream" herein are relative to the flow of a fuel through the pump. It is further understood that relative terms such as "top," "bottom," "above," "below" and "beneath" are relative to fuel pump components as viewed in the drawings herein and not necessarily to the particular orientation of the components when the fuel pump is disposed in a fuel tank.

Figure 2:
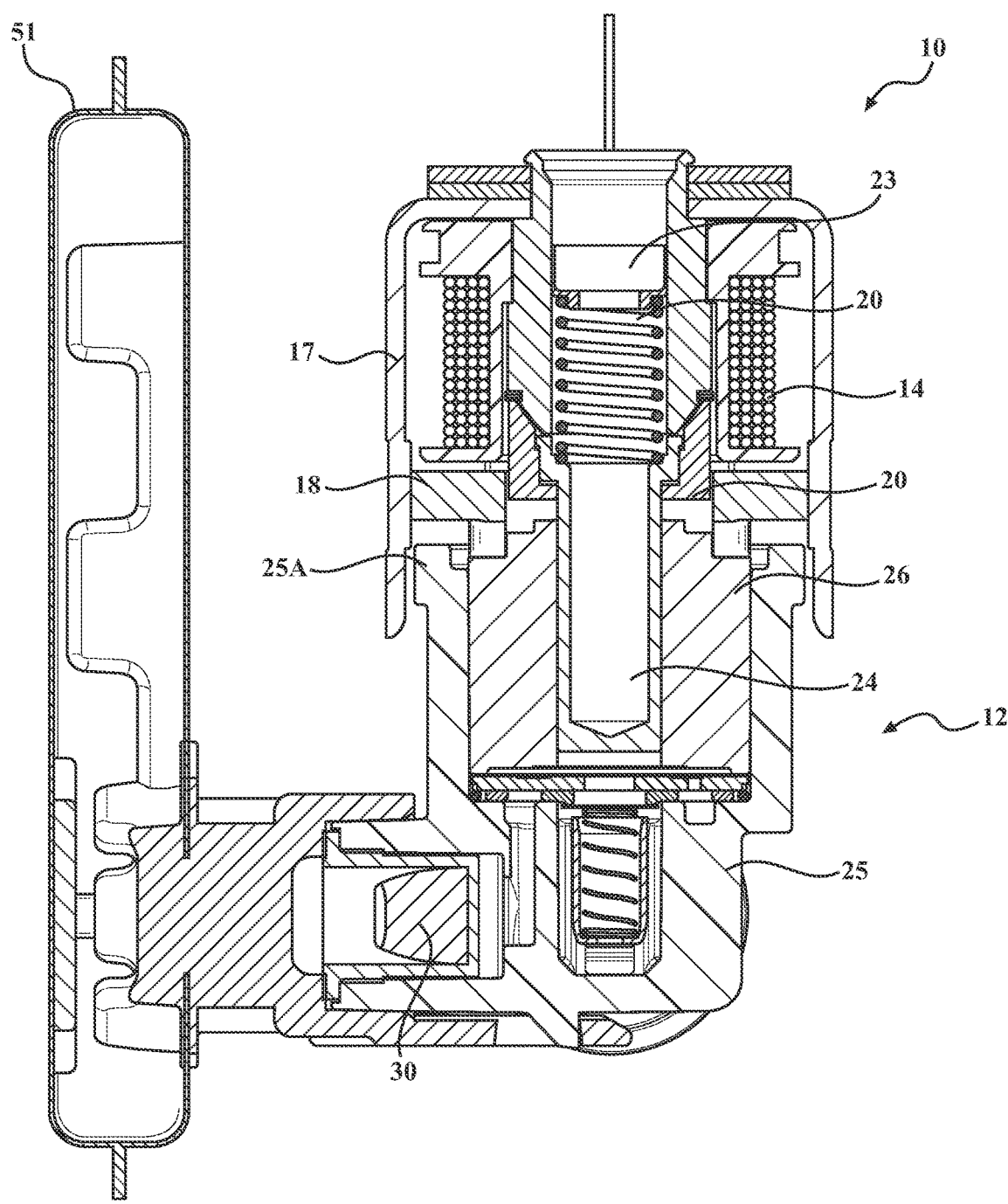
FIG. 2 is a cross sectional view of the fuel pump of FIG. 1 in the energized position.
Figure 3:
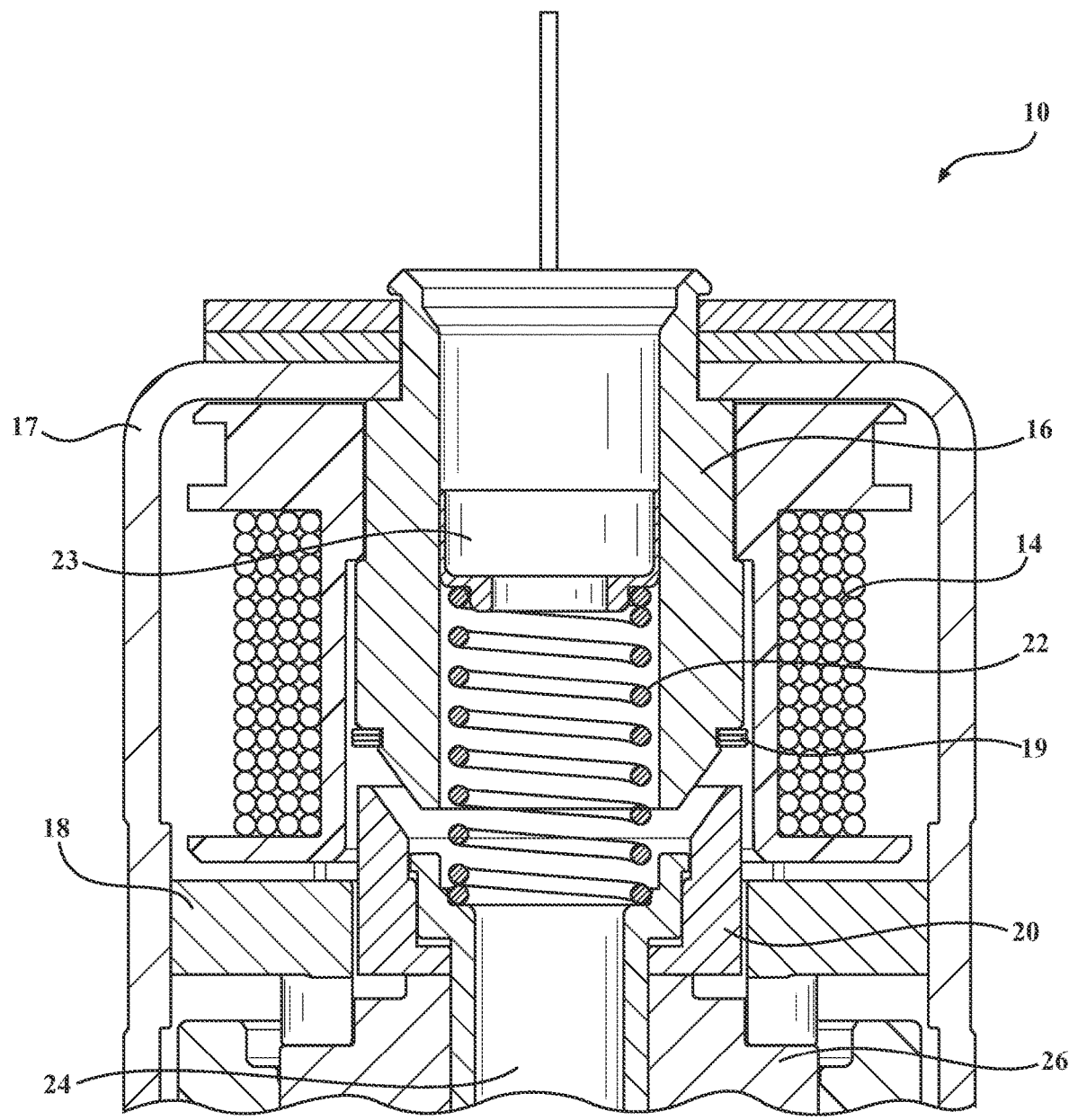
FIG. 3 is a cross sectional view of the power group of the fuel pump of FIG. 1 according to an example embodiment.

With reference to FIGS. 1-9, there is shown a fuel pump 100. Fuel pump 100 is a solenoid-actuator fluid pump. The solenoid driving the pump 100 is configured to be a wet design submerged (or mostly submerged) in the fuel tank. The pump 100 includes a power group 10 and a valve group 12. Power group 10 controls the actuation of the valve group 12 based upon an electrical signal(s) provided by the ECU of the powered apparatus or vehicle (not shown). The solenoid forms part of the power group 10. As shown in FIGS. 1-3, the solenoid includes a coil 14. Power group 10 further includes a pole piece 16, a bobbin and a bobbin retainer 18, shock absorbing disks 19 and a movable armature 20. The pump 100 is a wet design which allows the coil 14 to operate at high frequency while maintain the proper resistance by forced convection of the coil 14. This cooling effect is disclosed previously in US patent publication 20160108909. This fuel pump 100 operates from idling low frequency, such as between 5-10 Hz, to high frequency, such as 100 Hz, while at the maximum engine speed and have nearly identical pumping function at all frequencies and flows in between. The pump 100 is configured to deliver between 1 and 16 mg of fuel from the outlet port thereof into the fuel line (not shown) at the pressure needed for the injector (not shown) to meter the fuel thereto. This requires that the solenoid fully attracts the armature 20 while working against inertia, friction, fluidic forces and stored energy into a calibration spring 22 of the solenoid in the power group 10, closing the gap between the armature 20 and the armature stop associated with pole piece 16 in approximately 3.5 milliseconds to share the time between the intake phase and the exhaust phase. The armature 20 is connected to a plunger or piston 24 of the valve group 12. To lower the inertia of the plunger 24, the plunger is hollow to reduce the mass of the armature assembly, which includes the armature 20 and plunger 24. A spring retainer 23 is disposed above the spring 22 and maintains the spring at the desired compression. The spring retainer 23 includes a through-hole or aperture 23A for passing a secondary swept volume of fuel, as described in greater detail below.

The fuel pump 100 is designed in such a way that upon energizing the solenoid, the armature 20 and joined plunger 24 are attracted to the pole piece 16 and move thereto until hitting the shock absorbing, annular disk 19 and coming to a stop. FIG. 1 depicts the armature 20 when the solenoid is in its de-energized position before being energized, and FIG. 2 depicts the armature 20 when the solenoid is in its energized position, at the end of a full stroke of the armature 20. Upon de-energizing the solenoid, the magnetic field decays and the calibration spring 22 pushes the armature 20 away from the pole piece 16. The operational phases can change the characteristics of the motion of the armature 20 and will be discussed in the phases noted below.

Figure 4:
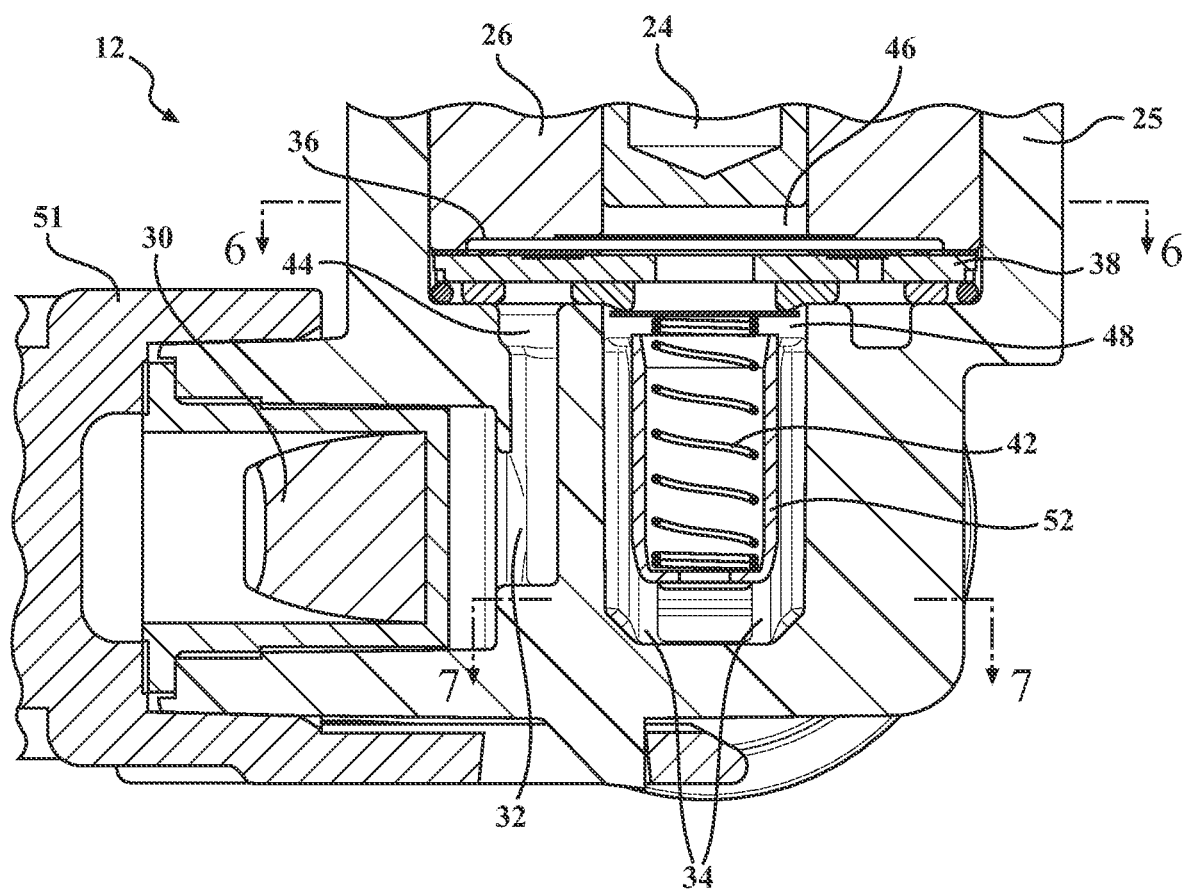
FIG. 4 is a cross sectional view of the valve group of the fuel pump of FIGS. 1 and 2 according to an example embodiment.
Figure 5:
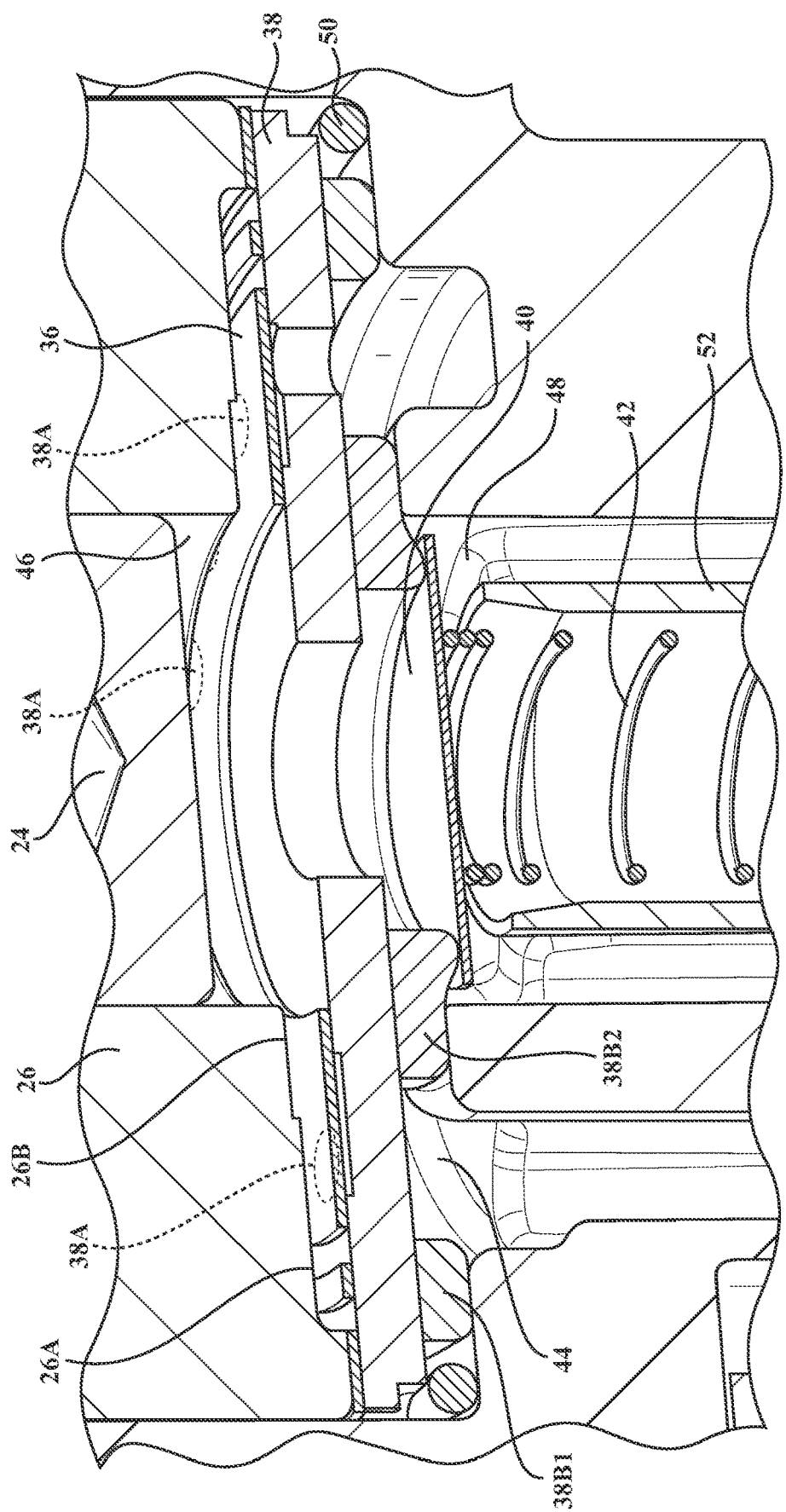
FIG. 5 is an expanded perspective view of the valve group of the fuel pump of FIG. 4.
Figure 6:
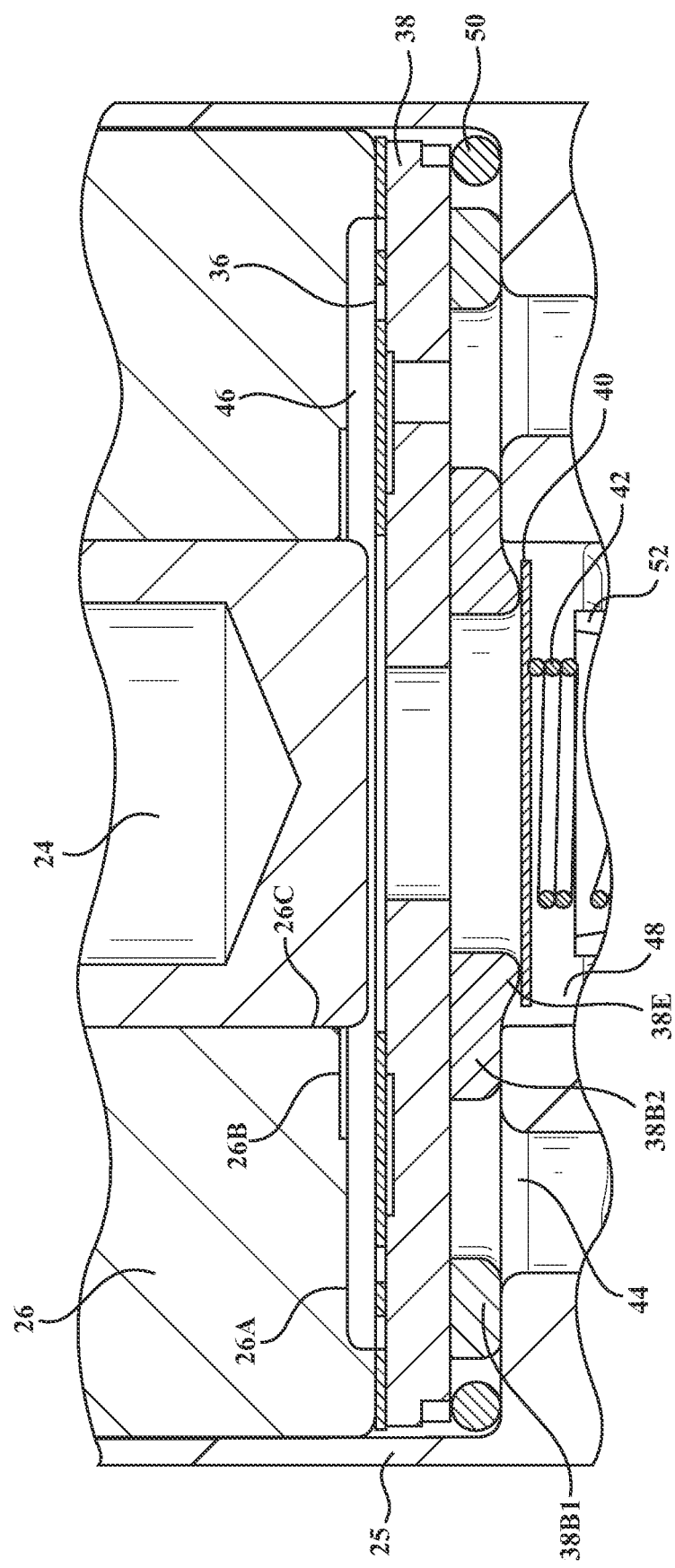
FIG. 6 is a cross sectional view of the valve group of FIG. 4.

As shown in FIGS. 1-2 and 4-8, the valve group 12 includes a pump body 25, a bushing 26 at least partly disposed in pump body 25 and having a through-hole in which the plunger 24 is movable, and a protection valve 30 disposed within pump body 25. Pump body 25 includes a fuel inlet passage 32 (FIG. 4) defined therein in which fluid which passes through the protection valve 30 flows. The pump body 25 further includes one or more fluid outlet passages 34 through which fuel passes prior to exiting the pump body 25. Disposed between the fuel inlet passage 32 and the fuel outlet passage 34 is an inlet disk 36, a valve seat 38 and an outlet disk 40 (FIGS. 4-6). The valve seat 38 is fixedly disposed within the pump body 25. Best seen in FIG. 5, a portion of the inlet disk 36 is movably disposed between the bushing 26 and the valve seat 38, and the outlet disk 40 is disposed downstream of the valve seat 38. An outlet spring 42 is disposed within the pump body 25 to bias the outlet disc 40 against the valve seat 38.

Within pump body 25 are a number of chambers for holding fuel. Referring to FIGS. 4 and 5, an inlet chamber 44 is formed at least partly within fuel inlet passage 32 upstream of inlet disk 36. A pump chamber 46 is defined at least partly within the through-hole of bushing 26 in which plunger 24 is disposed, and includes the space downstream of inlet disk 36 and upstream of outlet disk 40. An outlet chamber 48 is disposed downstream of outlet disk 40 and is at least partly defined within the fuel outlet passages 34.

The valve seat 38 includes a plurality of apertures 38A defined axially or nearly axially through the seat. In the example embodiment illustrated, the apertures 38A surround a radial center of the valve seat 38, and are evenly distributed about the center. At least one aperture 38A is disposed directly above the inlet chamber 44. Fuel passing from the inlet chamber 44 to the pump chamber 46 pass through the apertures 38A and urge a portion of the inlet disk 36 away from the valve seat 38, thereby forming a fuel path into the pump chamber 46.

Figure 7:
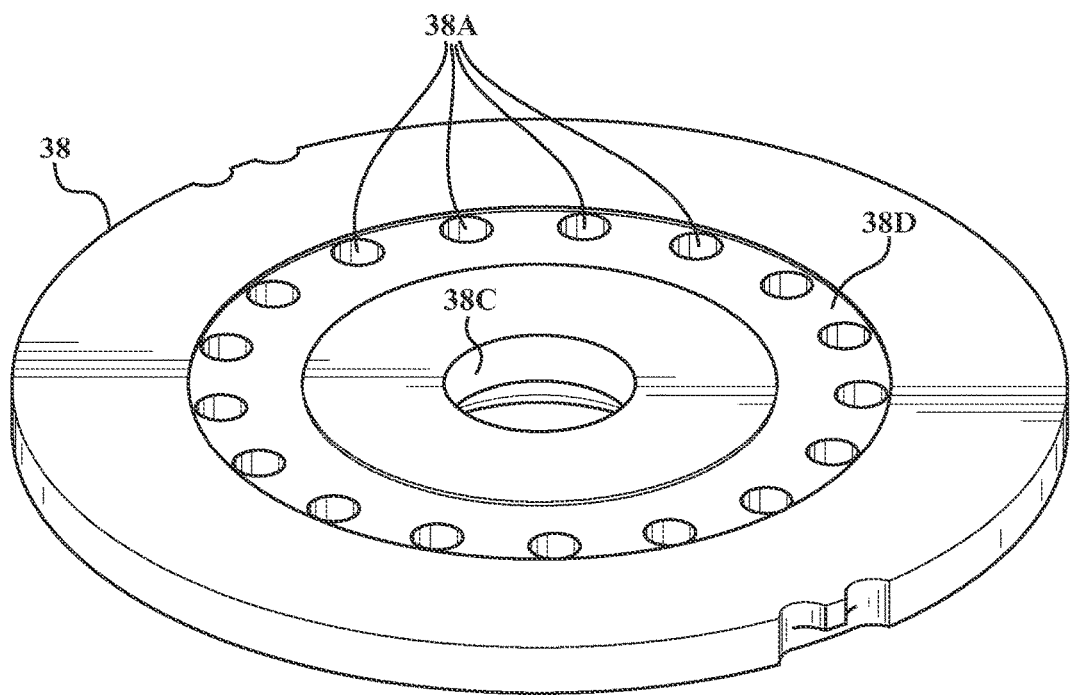
FIGS. 7 and 8 are perspective views of a valve seat of the valve group of FIG. 4 according to an example embodiment.
Figure 8:
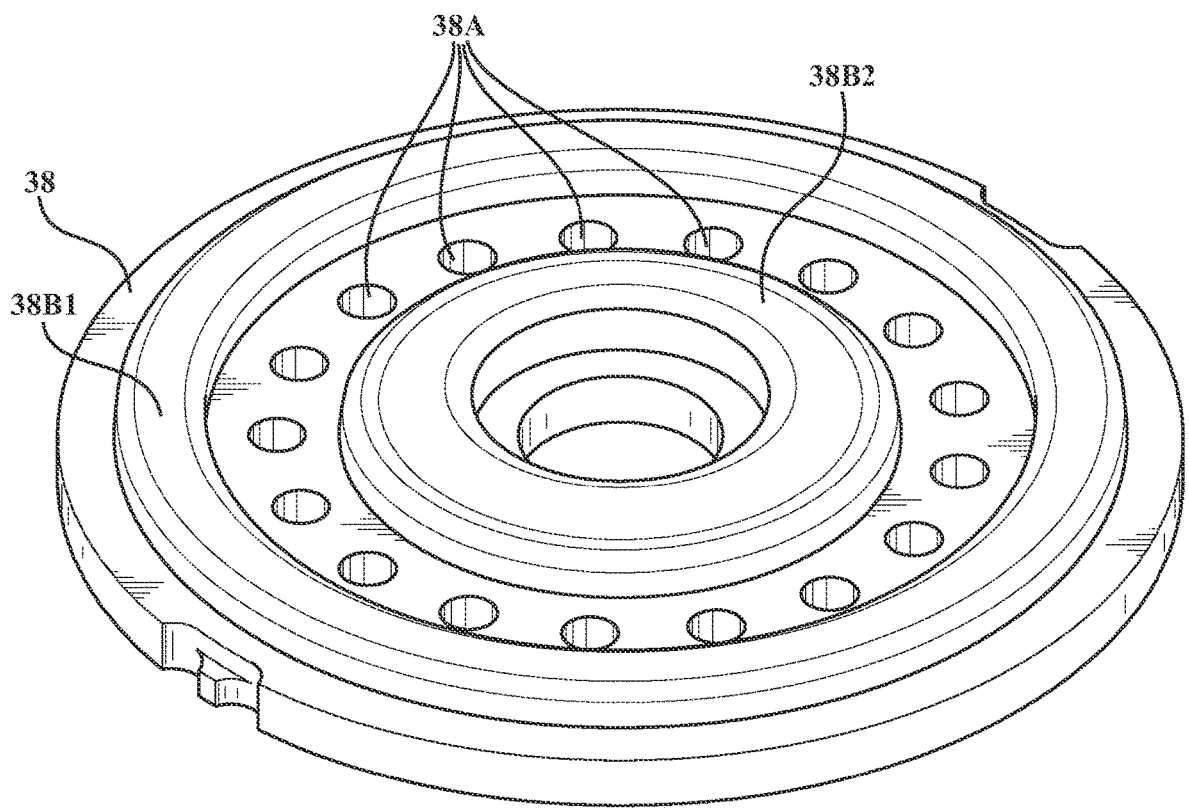

Best seen in FIGS. 7 and 8, the valve seat 38 is a disc or cylindrical shaped member constructed from metal, plastic or similarly rigid material. Valve seat 38 includes a plurality of apertures 38A defined axially or nearly axially through the seat. In the example embodiment illustrated, the apertures 38A surround a radial center of the valve seat 38, and are evenly distributed about the center and arranged in a bolt circle pattern. The number and size of apertures 38A may vary dependent upon the particular application of the valve group 12. At least one aperture 38A is disposed directly above the inlet chamber 44. Fuel passing from the inlet chamber 44 to the pump chamber 46 pass through the apertures 38A and urge a portion of the inlet disk 36 away from the valve seat 38, thereby opening the inlet check valve and forming a fuel path into the pump chamber 46. Apertures 38A surround an aperture 38C defined axially through a radial center of the valve seat 38. Aperture 38C has a larger diameter than the diameter of apertures 38A.

The valve seat 38 includes a relatively shallow groove 38D defined along the upper surface of the seat. A downstream end of each aperture 38A is located within the groove 38D. This groove 38D is at least the width of the apertures 38A, and runs or extends 360 degrees around the valve seat 38, ensuring each of the apertures 38A is within the groove 38D. The groove depth may vary but is generally not more than half of the thickness of the valve seat 38D itself.

The top of the valve seat 38 is flat and/or planar and has a polished finish to aid in sealing since the inlet disk 36 contacts the polished area. As best shown in FIGS. 5 and 6, the inlet disk 36 only covers up the radial outer portion of the top surface of the valve seat 38 and the apertures 38A along with the groove 38D. The radial center portion of the valve seat 38, where the aperture 38C is located, is not covered up by the inlet disk 36. The inlet interface between the valve seat 38 and the inlet disk 36 is metal-to-metal and both parts are flat and smooth in order to provide a seal. This inlet disk 36 seals with the valve seat 38 on either side of the groove 38D so a large amount of the inlet disk 36 does not actually touch the valve seat 38. The groove 38D allows reduced or minimal contact between the inlet disk 36 and the top of the valve seat 38, as well as allows the inlet fluid pressure to communicate to a significant area of the inlet disk 36 during operation of the valve group 12, as discussed in greater detail below. The space within the groove 38D and the space in the apertures 38A form part of the inlet chamber 44.

The bottom surface of the valve seat 38 has two radially separated but concentric, raised seat rings 38B molded onto and extending from the bottom surface, as shown in FIG. 8. The seat ring 38B1 is the radially outermost seat ring 38B which is bonded in between the outer diameter of the valve seat 38 and the bolt circle of apertures 38A. The seat ring 38B2 is bonded in between the center aperture 38C and the apertures 38A. This seat ring 38B has an extra protrusion or lip 38E (FIG. 6) added along the inner diameter of the ring so as to extend in an axial direction further away from the inlet disk 36 than the rest of the seat ring 38B2 and the seat ring 38B1. Along this protrusion 38E is where the flat, circular outlet disk 40 sealing contacts the bottom of the valve seat 38 and provide a seal between the pump chamber 46 and the outlet chamber 48. Best seen in FIGS. 5 and 6, the inlet chamber 44 is at least partly defined between the two seat rings 38B, and the pump chamber 46 is partly defined in the space in the center aperture 38C and the space within the inner seat ring 38B2. The seat rings 38 are constructed from a resilient, elastic and/or compressible material, such as rubber. Seat ring 38B2 provides a sealing surface for the outlet disk 40, and seat rings 38B1 and 38B2 provide sealing surfaces for a wall within the valve body 25 so as to at least partly define the inlet chamber 44 and the fuel inlet passage 32, as shown in FIGS. 5 and 6. In addition to providing a sealing contact and controlling fuel flow between the pump chamber 46 and the outlet chamber 48, the seat ring 38B2 also provides a seal between the inlet chamber 44 and each of the pump chamber 46 and the outlet chamber 48. The seat ring 38B1 provides a seal between the inlet chamber 44 and the pump chamber 46.

As mentioned, a portion of the inlet disk 36 is displaceable between the bushing 26 and the valve seat 38. The bushing 26 includes a stop 26A against which part of the inlet disk 36 contacts when the inlet disk 36 is separated from the valve seat 38 and passes fuel from the inlet chamber 44 to the pump chamber 46. The bushing 26 also includes a step 26B which in the illustrated embodiment is disposed radially inwardly of the stop 26A so as to reduce the contact surface of the bushing 26 with the inlet disk 36, thereby providing easier separation thereof when the inlet disk 36 returns to its position against the valve seat 38.

Figure 9:
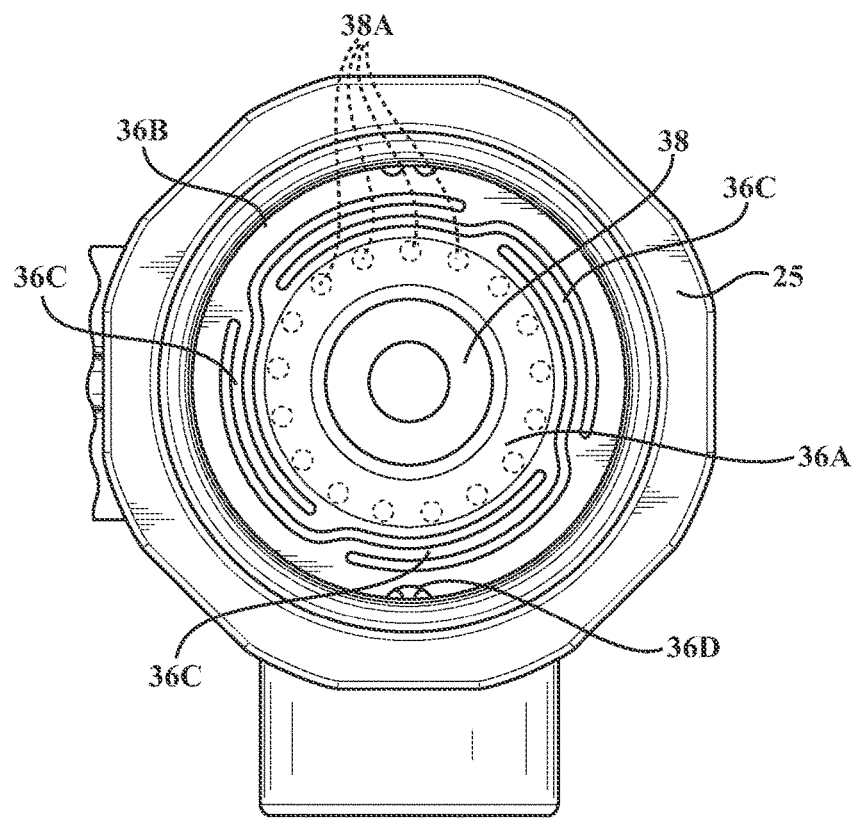
FIG. 9 is a top view of the valve group taken along the 6-6 line of FIG. 4.
Figure 10:
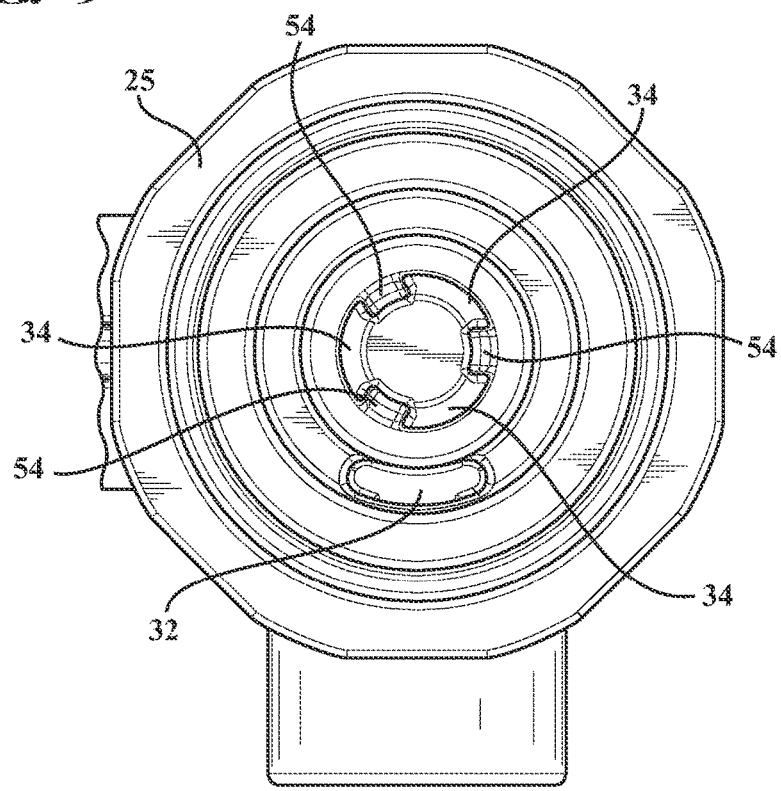
FIG. 10 is a top view of the valve group taken along the 7-7 line of FIG. 4.
Figure 11:
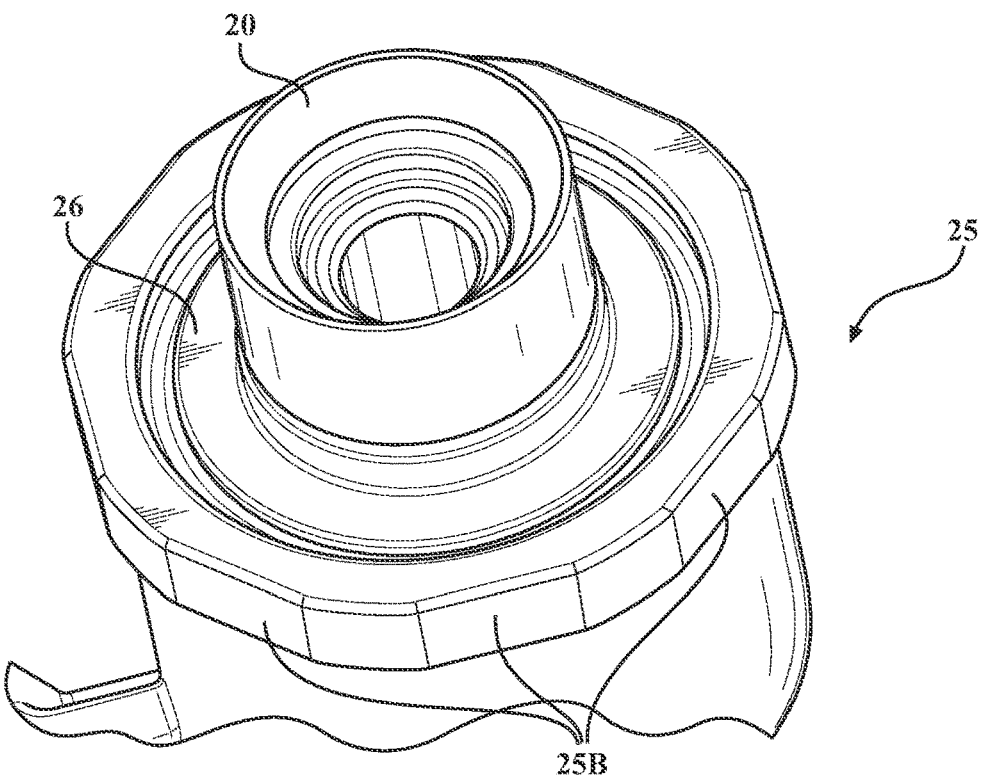
FIG. 11 is a top perspective view of a portion of the valve group of the fuel pump of FIG. 4.

Best seen in FIG. 9, the inlet disk 36 includes a radially inner portion 36A and a radial outer portion 36B. In the example embodiment illustrated, the outer portion 36B is fixed within the valve body 25. Connected between the inner portion 36A and the outer portion 36B are a plurality of legs 36C. Legs 36C extend between the inner portion 36A and the outer portion 36B and are configured so as to serve as a spring for allowing the inner portion 36A to be lifted or otherwise elevated relative to the outer portion 36B. In the example embodiments, fluid pressure due to a pressure differential between the inlet chamber 44 and the pump chamber 46 during energizing of the solenoid causes fuel to pass through apertures 38A which lifts the inner portion 36A and moves the inner portion 36A towards the bushing 26. Subsequently, when the pressure differential reverses due to de-energizing the solenoid and the plunger 24 and the armature 20 move away from the pole piece 16, the inner portion 36A moves away from the bushing 26 and returns to its position being largely in the same plane as the outer portion 36B. In an example embodiment, one or more of the legs 36C is sized differently so as to provide an asymmetric spring in which a first section of the inner portion 36A is lifted away from the valve seat 38 prior to other sections of the inner portion 36A lifting from the valve seat 38, and another section of the inner portion 36A moves from the bushing 26 to the valve seat 38 prior to other sections of the inner portion 36A doing same. In an example embodiment, each leg 36C is configured differently from each of the other legs 36A.

Best seen in FIGS. 5 and 6, the valve group 12 further includes a stop wire 50, which is a ring shaped member constructed from uncompressible material, such as metal or a rigid plastic. The stop wire 50 is disposed in the valve body 25 at the radial outer end of the valve seat 38 such that the stop wire 50 is disposed adjacent to and is radially outside of the seat ring 38B1. A diameter of the stop wire 50 is sized similarly to the amount of axial extension of the seat ring 38B1, such as having a diameter that is slightly less than such axial extension. With the stop wire 50 being constructed from an uncompressible material, the stop wire 50 serves to limit the amount of compression of seat rings 38B1 and 38B2. Though the drawings depict the stop ring 50 as having a circular cross section, it is understood that the stop ring may have different cross sectional shapes.

Figure 12:
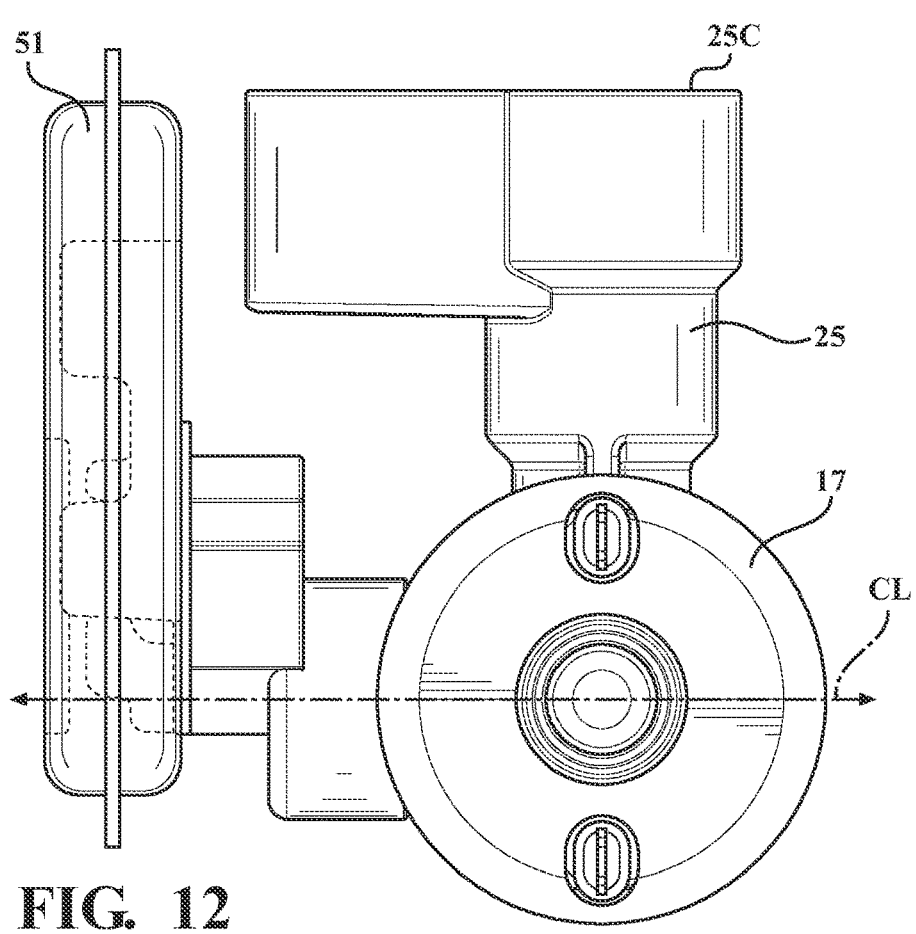
FIG. 12 is a side view of a portion of the fuel pump of FIGS. 1 and 2 as oriented when in a fuel tank.
Figure 13:
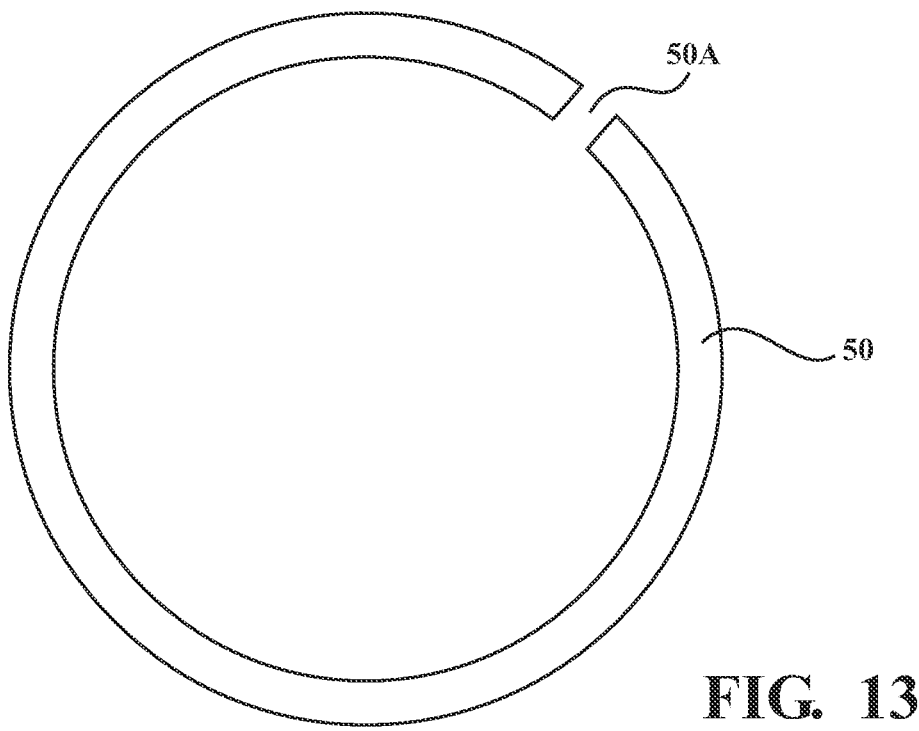
FIG. 13 is a top view of a stop wire of the valve group of FIG. 1 according to an example embodiment.
Figure 14:
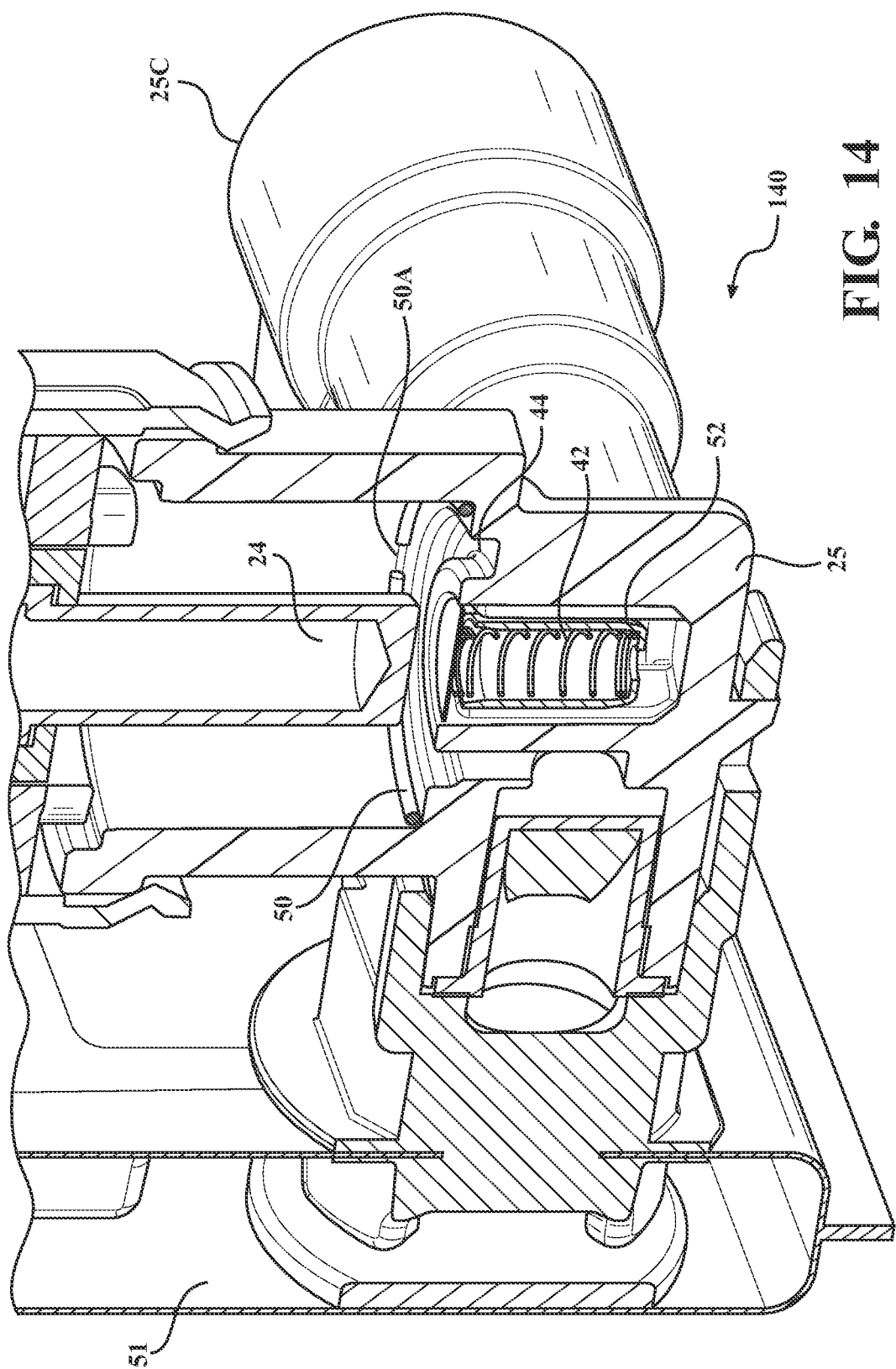
FIG. 14 is a cross sectional view of a portion of the valve group of FIG. 4 according to an example embodiment.

As shown in FIG. 13, the stop wire 50 is largely ring shaped. In an example embodiment, the stop wire 50 includes a radial gap or space 50A such that the stop wire 50 has a semi-annular or near annular shape. The stop wire 50 is disposed in the valve body 25 such that any trapped air bubbles in the valve body 25, such as in the fuel inlet passage 32, are able to pass through the gap 50A and enter the pump chamber 46 and ejected from the valve assembly, such as through the outlet chamber 48 and the fluid outlet passages 34, or through the clearance gap discussed above between the bushing 26 and the plunger 24. FIG. 14 illustrates a cross sectional view of the valve group 12 with the bushing 26, inlet disk 36 and valve seat 38 removed for clarity, illustrating the orientation and location of the gap 50A of the stop wire 50. Here, the stop wire 50 is positioned such that the gap 50A is disposed generally between the pump chamber 46 and the fluid outlet 25C of the valve body 25, which is positioned upwardly when installed in a fuel tank as shown in FIG. 12. The placement of the gap 50A thus allows trapped air bubbles to pass through the gap and move into the pump chamber 46 from the space bounded radially inwardly by the outer diameter of the seat ring 38B1, bounded radially outwardly by the inner diameter of the stop wire 50, bounded above (relative to the view of FIG. 6) by the valve seat 38 and bounded below by a horizontal shoulder of the pump body 25. After passing through the gap 50A, the air bubbles are able to enter the pump chamber 46 by passing around the radially outer edge of the valve seat 38. Once in the pump chamber 46, the air bubbles are then able to pass through the outlet valve and exit the fuel pump 100 via the outlet 25C. This is accomplished by having gap 50A of stop wire 50 at the highest elevation when the fuel pump 100 is disposed in the fuel tank.

The pump 100 further includes an inlet filter 51. Filter 51 is disposed upstream of pump body 25. A fuel outlet of filter 51 is connected to the pump body 25 at the inlet of protection valve 30.

The first phase of operation, after being properly installed into the system, is priming the fuel pump 100. The pump 100 is installed in the fuel tank (not shown), the outlet port of the pump 100 being plumbed directly to the fuel line (not shown) that feeds the fuel injector (not shown). Fuel in the fuel tank surrounds or completely wets the pump 100 and the fabric in the filter 51 wicks into the filter, wetting the outer portion of the protection valve 30 (i.e., the side facing the inside of the filter 51). At this point, when the ECU commands the engine to start, the solenoid is cycled at a high frequency, such as 100 Hz but it is understood that any of a number of other frequencies will work. This frequency was selected to allow for a short duration of priming. While the solenoid of pump 100 cycles, a differential voltage is applied to the coil 14 and the electrical current therein builds. The electrical current along with the magnetic circuit design lead to the generation of magnetic flux, which leads to an electromagnetic attraction between the armature 20 and the pole piece 16. When the magnetic attraction force exceeds the spring force of the spring 22, the armature 20 moves axially in a manner which reduces the air gap between the armature 20 and the pole piece 16. The plunger 24 has an interference fit into or with the armature 20 so as to move therewith, and is bound by the close fitting bushing 26. The plunger 24 slides inside the bushing 26 until the armature 20 contacts the shock absorbing disks 19 installed onto or adjacent the pole piece 16 (FIG. 2).

During this attraction phase, the motion of the armature 20 moves the plunger 24 so as to cause the expansion of the volume of the pump chamber 46. This expansion of the volume of the pump chamber 46 creates a lowered or reduced pressure in the pump chamber 46. This lowered pressure tends to create a differential pressure between the surface of the inlet disk 36 facing the inside the pump chamber 46, and the opposite surface of the inlet disk 36 facing against the valve seat 38 and exposed to the inlet chamber 44 via the holes in the valve seat 38. A groove in the seat 38 facing and adjacent the inlet disk 36 effectively eliminates material in the seat 38 to reduce the contact area between the inlet disk 36 and the seat 38, to make the pump 100 less sensitive to fuels of differing viscosities. Once the differential pressure across the inlet disk 36 exceeds the ability of the disk's internal spring (i.e., legs 36C) to hold the disk 36 against the seat 38 (in the sealed position), the inlet disk 36 will open with the inner portion 36A lifting from the valve seat 38. When the inlet disk 36 separates from the seat 38, the negative pressure in the pump chamber 46 draws in air (priming cycles) and the pressure quickly equalizes in the pump chamber 46 and the inlet chamber 44. The inlet chamber 44 is the region bound by the valve body 25, the valve seat side of the inlet disk 36, and the concentric rubber seals 38B on the side of the valve seat 38 opposite the pump chamber 46 and the outlet passages 34, with the fuel inlet passage 32 leading to the exhaust end of the protection valve 30.

As the priming cycling continues, the pressure in the inlet chamber 44 is slowly reduced until the protection valve 30 experiences a differential pressure large enough to draw some fuel from the inlet filter 51. This first draw of fuel into the inlet chamber 44 reduces the volume that the pressure equalizes with, drawing in more fuel each cycle until the pump chamber 46 is mostly full with fuel. One feature of the pump 100 is controlled levels of leakage (bypass flow) from the pressurized pump chamber 46 through the diametrical clearance between the plunger 24 and the bushing 26. One feature of this leakage is during priming, the air in the pump chamber 46 is quickly exhausted, even in a scenario where the fuel line is pressurized.

Also occurring each cycle during priming of the pump 100, but especially once the pump chamber 46 is even slightly filled with liquid, and with pump 100 being capable of pushing fuel into a fully pressurized fuel line with partial filling of approximately 25%, is the plunger 24 pressurizes the pump chamber 46 in such a way that the differential pressure between the outlet chamber 48 and the pump chamber 46 forces pressurized fuel into the outlet chamber 48 and into the fuel line. The pump 100 operates going full stroke, meaning the armature 20 stops on the bushing 26 while the solenoid is off, and is fully attracted to the pole piece 16 and stops against the shock absorbing disks 19 while the solenoid is activated. Once the fuel line completely fills with pressurized fuel, the priming is complete, and the pump device 100 naturally begins to operate in a normal mode of operation.

The normal mode of operation mode is utilized to run an engine. The cycle's duration is proportional to the speed of the engine. In a 4 stroke/cycle engine, a power cycle occurs once every two revolutions of the engine and the fuel injector typically injects fuel one time per power cycle. Typically the pump 100 and the fuel injector are cycled in synchronicity with the engine speed at a time or crank angle offset where the injector actuates a short time after the actuation of the pump 100, such as between 1 ms and 7 ms. The description of the full cycle is described below and starts with a fully pressurized fuel line.

The command from the ECU actuates the pump driver (not shown) which applies a voltage differential to coil 14 and the current begins to build. When the current-generated magnetic force exceeds the spring force of the spring 22, the armature 20 (with the plunger 24) begins moving towards the pole piece 16 and the motion of the plunger 24 lowers the pressure in the pump chamber 46. The lower pressure in the pump chamber 46 creates a differential pressure across the inlet disk 36. The shallow groove on the valve seat 38, which faces and is adjacent the inlet disk 36, allows for the pressure of the inlet chamber 44 to be communicated to a large surface area, increasing the differential pressure and helping the pump 100 be resistant to viscosity-driven stiction which would slow the separation of the inlet disk 36 from the valve seat 38. The differential pressure across the inlet disk 36 lifts the inner portion 36A of the inlet disk 36 at the least stiff location of the asymmetric spring formed by the legs 36C in order to trigger a peeling effect and improve the repeatability and shortening of the opening time of the inlet disk 36. To further take advantage of the asymmetry of the inlet disk 36, the radial location of the weakest/least stiff spot of the asymmetric spring portion on the disk is marked with a notch 36D. This notch 36D is used to orient the inlet disk 36 to align the least stiff part of the disk to be above the fuel inlet passage 32 feeding the inlet chamber 44. This allows for the fuel coming directly from the inlet port at the protection valve 30 to have a generally straight path through the flow holes 38A on the valve seat 38 and impinge on the inlet disk 36, providing more separation of the inlet disk 36 which reduces the time required to fill the pump chamber 46. This leads to a cascade effect of drawing fuel through the protection valve 30 and then through the inlet filter 51. It may take the entire remainder of the cycle for the inlet chamber 44 to reach pressure stabilization with the fuel tank. By this time, the armature 20 is very close to impacting the shock absorbing disks 19 which stop the motion of the armature 20 and the plunger 24. The solenoid remains activated for a short period of time following disk impact to allow the pump chamber 46 to fill completely. As the pressure of the pump chamber 46 approaches the pressure of the inlet chamber 44, the incoming fuel velocity decreases. When the momentum of the incoming fuel is reduced sufficiently, the inner portion 36A of the inlet disk 36 peels off of the stop 26A of bushing 26, which is stepped at step 26B to reduce the contact surface of the bushing 26 with the inlet disk 36, due to the asymmetric stiffness properties of the legs 36C of the inlet disk 36, and returns to the valve seat 38 which stops the incoming fuel flow into the pump chamber 46.

While the armature 20 is in motion, the fuel inside the power group 10, which is submerged in the fuel tank, helps the pump 100 in at least two distinct ways. First, with the high speed at which the solenoid moves the armature 20 and the plunger 24, parasitic or secondary pumping associated with the armature 20 and the plunger 24 creates a secondary swept volume of the armature 20 within the power group 10 which is used for two purposes. The volume under the bobbin retainer 18 that is bound by the solenoid housing 17, the valve body 25 and the bushing 26 sees an increasing volume which would generate a slight reduction in pressure. Since the bobbin retainer 18 and the armature 20 are a relatively close fit, the fuel which flows into this region predominantly comes through slots in the solenoid housing 17 and then through holes in the bobbin retainer 18. While flowing into the slots in the housing 17, the fuel helps to cool the coil 14.

The other use for the parasitic swept volume of fuel is to slow the velocity of the plunger 24 as the armature 20 nears the impact with the shock absorbing disks 19 so as to reduce the impact noise and the associated wear on the impact surfaces. As the impact of the armature 20 with the shock absorbing disks 19 nears, the fuel in the power group 10 from the secondary/parasitic swept volume may be separated into the two regions at either side of the impact. The region containing the shock absorbing disks 19 that is towards the longitudinal axis of the power group 10 is exploited for this purpose. The velocity of the armature 20 and the plunger 24 is approximately 1.2 meters per second as the armature 20 nears the impact with the shock absorbing disks 19 which leads to a velocity of the fuel being pushed out of the region through the through-hole 23A in the spring retainer 23 of the spring 22 that is nearly 10 meters per second. This high velocity through the relatively small hole 23A increases the pressure in this region which decelerates the armature 20 and the plunger 24 just before impact. The size of hole 23A and the entry edge of the calibration spring retainer 23 are controlled to reduce the noise of the impact of the armature 20 and the shock absorbers 19.

Figure 16:
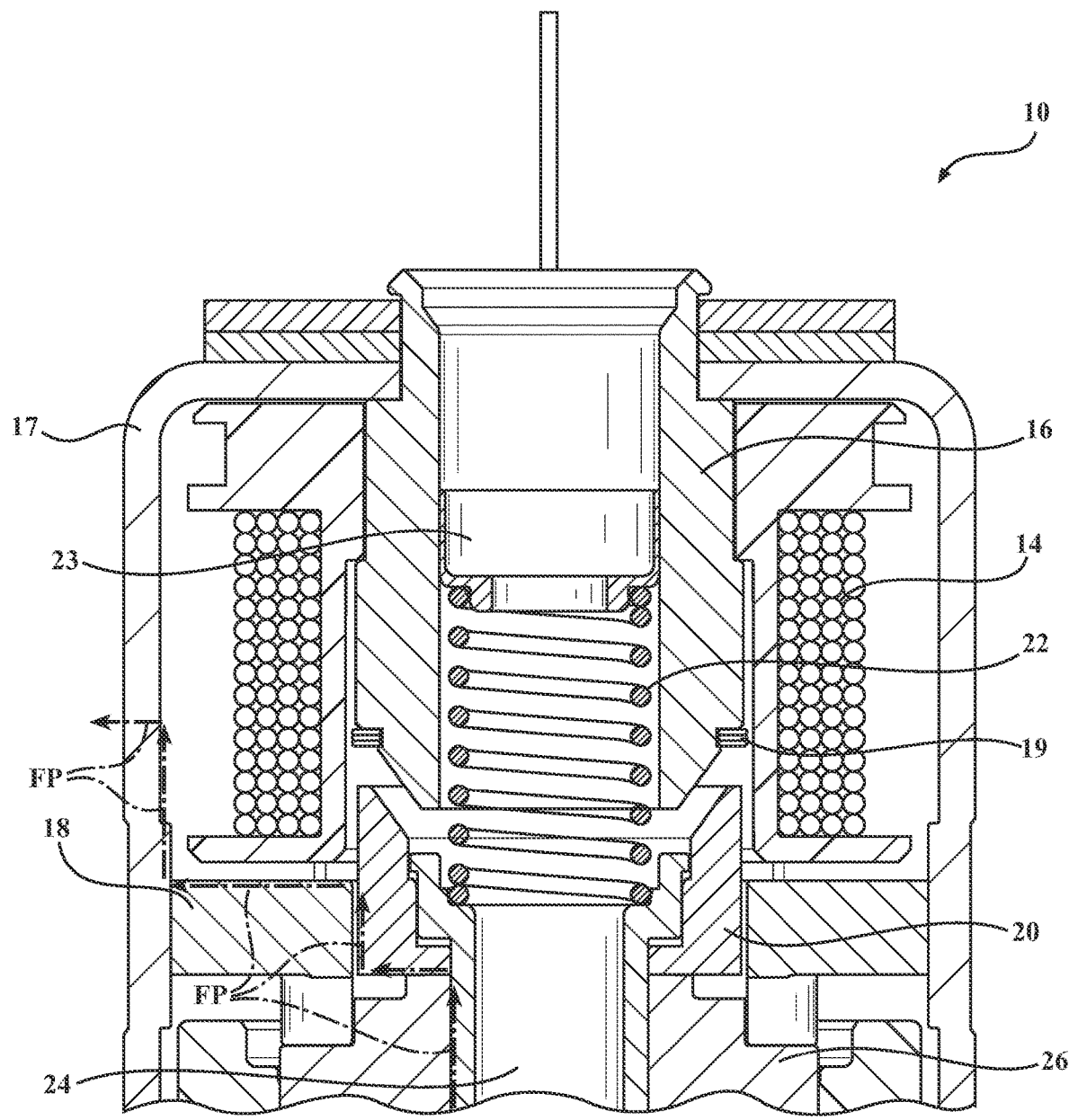
FIG. 16 is a cross sectional view of the power group of the fuel pump of FIG. 4 according to another embodiment.

In addition, FIG. 16 illustrates a flow path FP from the pump chamber 46, along the space between the inside diameter of the bushing 26 and the outside diameter of the plunger 24, the space between the lower surface of the armature 20 and the upper surface(s) of the bushing 26, the space between the inside diameter of the bobbin retainer 18 and the outside diameter of the armature 20, the space between the upper (as viewed from FIG. 16) surface of the bobbin retainer 18 and the lower surface of the bobbin, and the space between the inside diameter of the housing 17 and the outside diameter of the bobbin, before exiting through a window along housing 17 (not shown). Fuel passes through the flow path FP from the pump chamber 46 to the housing 17 and out of the fuel pump 100 when the armature 20 and the plunger 24 are on the downstroke and/or move towards the valve seat 38. This flow of fuel, which is filtered from having passed through the filter 51, keeps the relative pressure inside the housing 17 of the power group 10 positive so as to limit the amount of unfiltered fuel from the above-mentioned secondary swept volume from passing into the fuel pump 100 for cooling the coil 14 and hydraulically damping the impact of the armature 20 against the shock absorbing disks 19. This helps to reduce the potential of contamination in the fuel pump 100 from unfiltered fuel.

The fuel injector in the fuel injection system of which the pump 100 is a part, depending on the ECU programmed offset, may have already actuated which draws fuel from the fuel line (which provides fluid communication between the fuel injector and the pump 100) and the pressure is then decreased. As the pump is deactivated, and the magnetic field in the solenoid decays, the calibration spring 22 pushes the armature 20 away from the pole piece 16 and this motion increases the pressure of the pump chamber 46. When the differential pressure between the pump chamber 46 and the outlet chamber 48 exceeds the load of the outlet valve spring 42, the outlet disk 40 separates from the raised rubber seal 38B on the valve seat 38 and the fuel flows from the pump chamber 46 into the fuel line via the outlet chamber 48. The fuel flow exiting the pump chamber 46 is turned 90 degrees before reaching the fuel outlet port which imparts momentum to the low mass outlet disk 40. Adding to the forces designed to move the outlet disk 40 to allow full flow in less than 1 millisecond, the fuel flow is pushed through a small annulus between the outer diameter of the outlet disk 40 and the valve body walls to create a high velocity which takes advantage of the high drag coefficient of the thin, sharp edge disk 40. This drag and transferred momentum leads to nearly digital (open/closed) motion of the outlet disk 40. As the outlet disk 40 is forced away from the valve seat rubber seal 38B, the forces are adding potential energy into the outlet spring 42. This spring 42 is housed in a spring retainer 52, which is shaped similarly to a cup. The inner surface of the outlet disk spring retainer 52 starts generally cylindrical in shape and then tapers radially inwardly at a distance above the bottom of the retainer. The taper of the inner surface helps to center the outlet spring 42 and keep the spring from being pinched, since the top of the outlet spring retainer 52 is also the valve stop of the outlet valve, which sets the stroke of the outlet disk 40. The wall thickness for the outlet spring retainer 52 is mostly constant, and the taper on the inside surface is similar on the outer surface too. This surface taper on the outside of the retainer 52 ensures a clean press fit into the three ribs 54 in the outlet chamber 48 of the valve body (FIG. 7). The fuel exiting the pump 100 passes through the three fuel outlet passages 34 (FIG. 4) on the way to the outlet port and into the fuel line. There is also a small hole at the base of the outlet spring retainer 52 which allows for the equalization of pressure inside and outside of the retainer while the outlet disk 40 is forced against the stop at the rim or top of the retainer 52. This equalization of the pressures reduces the separation time for the outlet disk 42 from the rim and/or outlet disk stop of the outlet spring retainer 52. The outlet disk stop also has a small contact area to reduce fluidic stiction between the outlet disk 40 and the stop to further improve separation time and consistency. As the fuel exits the outlet chamber 48, the plunger 24 approaches the valve seat 38 and the armature 20 is continually moving away from the pole piece 16 under the influence of the calibration spring 22 and the pump chamber pressure reaction force on the face of the plunger 24. Included in this motion is the motion caused by the leakage flow in the diametrical clearance between the plunger 24 and the bushing 26. This leakage path forces flow of filtered fuel from the pump chamber 46 into the power group 10. This flow increases the resistance of the power group 10 to contamination and can help cool the coil 14 between actuation pulses. Also, as the secondary or parasitic pumping of the swept volume of the armature 20 helped during the attraction of the armature, this pumping also occurs to push fuel from under the bobbin retainer 18 and out of the housing 17 either through the slots in the side of the housing 17 or through the spring retainer 23.

The last mode of the pump 100 is the running out of fuel condition. Since the pump 100 is powered by a low electrical resistance coil 14, high speed solenoid, the high current draw may generate heat very quickly and relies on the fuel in the tank to cool the coil 14. To ensure a significant portion of the coil 14, such as approximately 30%, is still submerged in fuel when the pump 100 runs out of fuel, the base of the inlet filter 51 is raised off of the bottom of the fuel tank to be near the solenoid center line CL of the power group 10, as shown in FIG. 12, which illustrates the pump 100 when oriented in a fuel tank. In one example embodiment, the base or bottom of the filter 51 is offset or elevated from the center line CL of the solenoid assembly of the power group 10 such that when the filter 51 is no longer touching or receiving fuel, about 30% of the coil 14 remains submerged to avoid overheating of the coil. When the inlet filter 51 is removed from the fuel tank bottom, the pressure in the fuel line will quickly decrease and the engine will stall. Upon refilling the tank, the pump 100 will prime starting from a mostly wet state, and normal operation will continue.

Assembling the power group 100 and the valve group 12 will be described. These two subassemblies are paired together with the bobbin retainer 18 mating with the bushing 26. The bobbin retainer 18 has a close fitting inside diameter (ID) that axially aligns the power group 10 to the valve group 12 and the bobbin retainer has three "feet" or protrusions extending from the bobbin retainer toward the bushing 26 of the valve group 12. Once the cylindrical surfaces are aligned, the power group 10 is pushed until the three feet of the bobbin retainer 18 are pressed into contact with a mating shoulder on the bushing 26 of the valve group 12. This mated position, along with the dimensions of the armature 20, ultimately sets the stroke of the armature 20 and the attached plunger 24. The stroke of the plunger 24, as well as the diameter thereof, controls the primary swept volume and controls the maximum volume of fuel the pump 100 provides to the fuel line. This primary swept volume also affects the priming duration of the pump 100.

Once the subassemblies are paired together, the next step in the assembly of the pump 100 is to permanently join the power group 10 to the valve group 12. This is accomplished by roll forming the subassemblies. The thin metal housing 17 is rolled while the assembly is held in compression by a spring in the tooling. As the solenoid housing 17 is rolled, it deforms inwardly towards the generally cylindrical valve body 25 of the valve group 12. Seen in FIG. 14, the deformed metal 17A from the housing 17 contacts a flange 25A molded into the plastic valve body 25. The molded flange 25A on the valve body 25 includes flats 25B (FIG. 8) which are planar portions disposed around the flange 25A and/or the valve body 25 that allow the joint between the power group 10 and valve group 12 to resist relative motion while under axial load provided mostly from the flange 25A, as well as torque which is aided by the flats on the valve body 25.

Next, the calibration spring 22 and the spring retainer 23 are installed into the center of the pole piece 16. The retainer 23 is pressed to preload the calibration spring 22, which provides a force that urges the armature plunger 24 away from the pole piece 16 and towards the bushing 26. This position for the armature plunger 24 is the maximum distance between the end of the pole piece 16 and the armature 20. The spring 22 provides a force that generates the proper pressure for fuel in the pump chamber 46 that ultimately flows out of the chamber through the outlet disk 40 and outlet chamber 48, and into the fuel line at the prescribed pressure.

The next step in the assembly process includes inserting the protection valve 30 at the inlet port of the valve body 25 and installing the inlet filter 51, which holds the flange of the protection valve 30 while also helping to ensure the sealing of the filter 51 to the valve group 12 of the pump 100. The protection valve 30 may be a conventional design check style valve molded out of fluorosilicone known as a "duckbill valve." The inlet filter 51 has a generally cylindrical fit with the valve body 25, and a locking tab that engages a wedge style locking protrusion that holds the filter 51 in place, and orients the filter correctly. The protection valve 30 helps to reduce or minimize the amount of fuel, which when the vehicle is sitting in storage, can evaporate inside the pump chamber 46. This evaporated fuel can potentially lead to varnish that can render the pump 100 incapable of operating by mechanically stopping the action of the plunger 24 or inlet/outlet valve.

Figure 15:
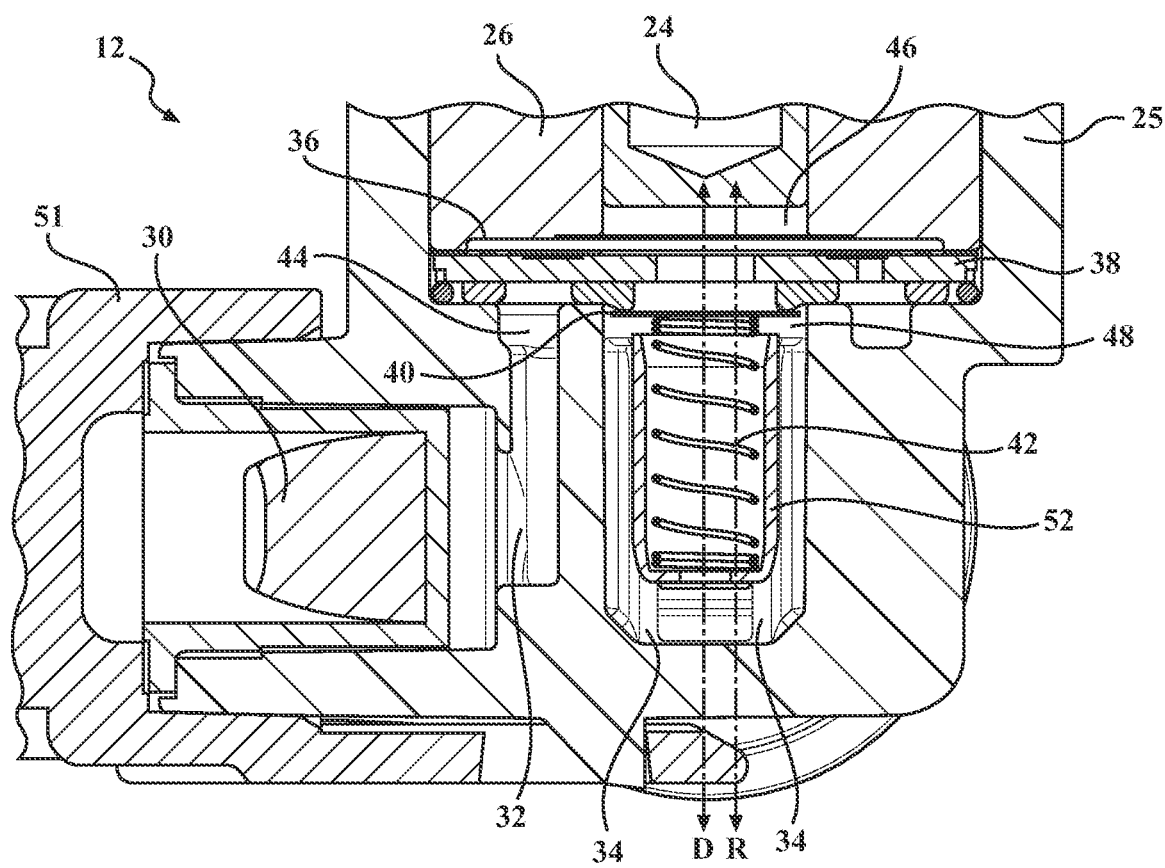
FIG. 15 is a cross sectional view of a valve group according to an example embodiment.

In another example embodiment, the outlet valve is configured so as to provide a peeling effect when separating from the valve seat 38 when opening and from the spring retainer 52 when closing. Specifically, the spring 42 and the spring retainer 52 are disposed offset and/or off-axis relative to the outlet disk 48 within the pump body 25, as shown in FIG. 15. In other words, the longitudinal axis R of the spring 42 and the spring retainer 52 is offset relative to the longitudinal axis D of the outlet disk 48. This off-axis/offset positioning of the spring 42 and the spring retainer 52 results in the spring force bearing on the outlet disk 40 varying along the outlet disk 40. A first section of the outlet disk 40 separates from engagement with the valve seat 38 prior to other sections of the outlet disk 40 separating from the seat, and a second section of the outlet disk 40 separates from the top of the spring retainer 52 prior to other sections of the outlet disk 40 separating from the retainer.

Example embodiment would be very useful in other fluid pumping applications that operate at high frequencies and work on the principle of positive displacement pumps using an inlet and outlet check style valves. The valve configuration described above allows for a very compact pump 100 with relatively small displacements for very high flows. Any pumping application where space is limited would be a good fit for the disclosed embodiments.

Embodiments have been described herein in an illustrative manner, and it is to be understood that the terminology which has been used is intended to be in the nature of words of description rather than of limitation. Obviously, many modifications and variations of the invention are possible in light of the above teachings. The description above is merely exemplary in nature and, thus, variations may be made thereto without departing from the spirit and scope of the invention as defined in the appended claims.

We claim:

1. A fuel pump, comprising:
 a power group including a housing, a coil, a pole piece and an armature, the coil, pole piece and armature are disposed within the housing, the armature being movable within the housing; and
 a valve group including a valve body, a plunger connected to the armature so as to be movable therewith, a bushing in which the plunger is at least partly disposed, an inlet chamber, an outlet chamber, a pump chamber, an inlet valve disposed between the inlet chamber and the pump chamber and an outlet valve disposed between the pump chamber and the outlet chamber, the outlet valve comprising a valve seat,
 wherein the valve body includes a plurality of planar portions which extend around an end portion of the valve body which is connected to the power group, and an end portion of the housing of the power group covers the end portion of the valve body and has a roll-formed engagement with the planar portions of the valve body, and
 wherein the valve seat includes a disk and a seat ring disposed along and extending from the disk, the seat ring defining at least part of an outer wall of the inlet chamber, and the valve group further comprises a stop wire disposed at least partly around the seat ring.

2. The fuel pump of claim 1, wherein the valve body includes a flange at the end portion of the valve body, the flange having an outer diameter that is greater than an outer diameter of the valve body at other portions, and the planar portions are disposed along the outer diameter of the flange.

3. The fuel pump of claim 1, further comprising an inlet filter coupled to a fluid inlet of the valve group, wherein the inlet filter is disposed relative to the coil such that when the fuel pump is disposed within a fuel tank, a bottom of the inlet filter, as oriented in the fuel tank, is disposed above a fuel level in the fuel tank while the coil is at least partly submerged in the fuel.

4. The fuel pump of claim 1, wherein the outlet valve further comprises an outlet disk, and an outlet spring all disposed within the valve body, the outlet spring biases the outlet disk towards the valve seat.

5. The fuel pump of claim 4, wherein a longitudinal axis of the outlet spring is offset from a longitudinal axis of the outlet disk.

6. The fuel pump of claim 4, wherein outlet valve further comprises a spring retainer disposed in the valve body, the outlet spring is disposed at least partly in the spring retainer and a longitudinal axis of each of the outlet spring and the spring retainer is offset from a longitudinal axis of the outlet disk.

7. The fuel pump of claim 6, further comprising an inlet filter coupled to a fluid inlet of the valve group, wherein the inlet filter is disposed relative to at least part of the coil such that when the fuel pump is disposed within a fuel tank, a bottom of the inlet filter, as oriented in the fuel tank, is disposed above a fuel level in the fuel tank while the coil is at least partly submerged in the fuel.

8. The fuel pump of claim 1, wherein the stop wire has an annular shape with a gap defined in the stop wire, the gap providing a path for trapped air bubbles disposed outside of the seat ring to enter the pump chamber when the fuel pump is disposed in a fuel tank, for exiting the valve body through the outlet valve.

9. A fuel pump, comprising:
a power group including a housing, a coil, a pole piece and an armature, the coil, pole piece and armature are disposed within the housing, the armature being movable within the housing;
a valve group including a valve body, a plunger connected to the armature so as to be movable therewith, a bushing in which the plunger is at least partly disposed, an inlet chamber, an outlet chamber, a pump chamber, an inlet valve disposed between the inlet chamber and the pump chamber and an outlet valve disposed between the pump chamber and the outlet chamber, the outlet valve comprising a valve seat; and
an inlet filter coupled to a fluid inlet of the valve group, wherein the inlet filter is disposed relative to the coil such that when the fuel pump is disposed within a fuel tank, a bottom of the inlet filter, as oriented in the fuel tank, is disposed above a fuel level in the fuel tank while the coil is at least partly submerged in the fuel,
wherein the valve seat includes a disk member and a seat ring disposed along and extending from the disk member, the seat ring defining at least part of an outer wall of the inlet chamber, and the valve group further comprises a stop wire disposed at least partly around the seat ring.

10. The fuel pump of claim 9, wherein the outlet valve further comprises an outlet disk, and an outlet spring, the valve seat, the outlet disk and the outlet spring disposed within the valve body, the outlet spring biases the outlet disk towards the valve seat, and a longitudinal axis of the outlet spring is offset from a longitudinal axis of the outlet disk.

11. The fuel pump of claim 10, wherein outlet valve further comprises a spring retainer disposed in the valve body, the outlet spring is disposed at least partly in the spring retainer and a longitudinal axis of each of the outlet spring and the spring retainer is offset from a longitudinal axis of the outlet disk.

12. The fuel pump of claim 9, wherein the stop wire has an annular shape with a gap defined in the stop wire, the gap providing a path for trapped air bubbles disposed outside of the seat ring to enter the pump chamber when the fuel pump is disposed in the fuel tank, for exiting the valve body through the outlet valve.

13. A fuel pump, comprising:
a power group including a housing, a coil, a pole piece and an armature, the coil, pole piece and armature are disposed within the housing, the armature being movable within the housing;
a valve group including a valve body, a plunger connected to the armature so as to be movable therewith, a bushing in which the plunger is at least partly disposed, an inlet chamber, an outlet chamber, a pump chamber, an inlet valve disposed between the inlet chamber and the pump chamber and an outlet valve disposed between the pump chamber and the outlet valve; and
an inlet filter coupled to a fluid inlet of the valve group, wherein the inlet filter is disposed relative to the coil such that when the fuel pump is disposed within a fuel tank, a bottom of the inlet filter, as oriented in the fuel tank, is disposed above a fuel level in the fuel tank while the coil is at least partly submerged in the fuel,
wherein the valve group and the power group include a first fuel flow path from the pump chamber to outside the housing of the power group, including between an inner diameter of the bushing and an outer diameter of the plunger, and between an inner diameter of the housing and an outer diameter of the coil, the first fuel path passing fuel under pressure from the pump chamber to the power group during a downstroke of the armature and the plunger so that fuel pressure within the power group is positive during operation of the fuel pump.

14. The fuel pump of claim 13, wherein the valve body includes a flange at an end portion of the valve body, the flange having an outer diameter that is greater than an outer diameter of the valve body at other portions.

15. A fuel pump, comprising:
a power group including a housing, a coil, a pole piece and an armature, the coil, pole piece and armature are disposed within the housing, the armature being movable within the housing; and
a valve group including a valve body, a plunger connected to the armature so as to be movable therewith, a bushing in which the plunger is at least partly disposed, an inlet chamber, an outlet chamber, a pump chamber, an inlet valve disposed between the inlet chamber and the pump chamber and an outlet valve disposed between the pump chamber and the outlet chamber,
wherein the outlet valve comprises a valve seat, an outlet disk, and an outlet spring all disposed within the valve body, the outlet spring biases the outlet disk towards the valve seat, and a longitudinal axis of the outlet spring is offset from a longitudinal axis of the outlet disk, and
wherein the valve group and the power group include a first fuel flow path from the pump chamber to outside the housing of the power group, including between an inner diameter of the bushing and an outer diameter of the plunger, and between an inner diameter of the housing and the outer diameter of the coil, the first fuel path passing fuel under pressure from the pump chamber to the power group during a downstroke of the armature and the plunger so that fuel pressure within the power group is positive during operation of the fuel pump.

16. A fuel pump, comprising:
a power group including a housing, a coil, a pole piece and an armature, the coil, pole piece and armature are disposed within the housing, the armature being movable within the housing; and
a valve group including a valve body, a plunger connected to the armature so as to be movable therewith, a bushing in which the plunger is at least partly disposed, an inlet chamber, an outlet chamber, a pump chamber, an inlet valve disposed between the inlet chamber and the pump chamber and an outlet valve disposed between the pump chamber and the outlet chamber,
wherein the outlet valve comprises a valve seat, an outlet disk, and an outlet spring all disposed within the valve body, the outlet spring biases the outlet disk towards the valve seat, and a longitudinal axis of the outlet spring is offset from a longitudinal axis of the outlet disk, and wherein the valve seat includes a disk and a seat ring disposed along and extending from the disk, the seat ring defining at least part of an outer wall of the inlet chamber, the valve group further comprises a stop wire disposed at least partly around the seat ring, the stop wire has an annular shape with a gap defined in the stop wire, the gap providing a path for trapped air bubbles disposed outside of the seat ring to enter the pump chamber when the fuel pump is disposed in a fuel tank, for exiting the valve body through the outlet valve.

17. The fuel pump of claim 15, wherein the valve body includes a plurality of planar portions which extend around an end portion of the valve body which is connected to the power group, and an end portion of the housing of the power group covers the end portion of the valve body and has a roll-formed engagement with the planar portions of the valve body, the valve body includes a flange at the end portion of the valve body, the flange having an outer diameter that is greater than an outer diameter of the valve body at other portions.

\* \* \* \* \*